United States Patent
Wilson et al.

(10) Patent No.: US 9,468,960 B2
(45) Date of Patent: Oct. 18, 2016

(54) EXTRUSION OF HIGH TEMPERATURE FORMABLE NON-FERROUS METALS

(75) Inventors: Robert Simon Wilson, Beaconsfield Upper (AU); Merchant Yousuff, Glen Waverley (AU); Nigel Austin Stone, Kilsyth (AU); David James Bell Ritchie, Carrum Downs (AU); Gersende Marie Delphine Cantin, Kew (AU); Mark Antony Gibson, Glen Waverley (AU); Ian Curtis Thomas, Garibaldi (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 524 days.

(21) Appl. No.: 14/004,361

(22) PCT Filed: Mar. 7, 2012

(86) PCT No.: PCT/AU2012/000231
§ 371 (c)(1),
(2), (4) Date: Sep. 10, 2013

(87) PCT Pub. No.: WO2012/119196
PCT Pub. Date: Sep. 13, 2012

(65) Prior Publication Data
US 2014/0000332 A1    Jan. 2, 2014

(30) Foreign Application Priority Data

Mar. 10, 2011    (AU) ................... 2011900864

(51) Int. Cl.
*B21C 23/00*    (2006.01)
*B22F 3/20*    (2006.01)

(52) U.S. Cl.
CPC ............. *B21C 23/00* (2013.01); *B21C 23/005* (2013.01); *B22F 3/20* (2013.01); *B22F 2999/00* (2013.01)

(58) Field of Classification Search
CPC ... B21C 23/00; B21C 23/005; B21C 23/008; B21C 29/003; B21C 29/006; B22F 3/20; B22F 3/003
See application file for complete search history.

(56) References Cited

U.S. PATENT DOCUMENTS

| | | |
|---|---|---|
| 3,765,216 A | 10/1973 | Green |
| 3,872,703 A | 3/1975 | Green |

(Continued)

FOREIGN PATENT DOCUMENTS

| | | |
|---|---|---|
| JP | 58-221613 | 12/1983 |
| JP | 59-113920 | 6/1984 |
| JP | 61-195969 | 8/1986 |
| JP | 01-129905 | 5/1989 |
| JP | 10-166035 | 6/1998 |

OTHER PUBLICATIONS

International Search Report, mailed May 7, 2012 in connection with PCT International Application No. PCT/AU2012/000231, filed Mar. 7, 2012.

(Continued)

*Primary Examiner* — Teresa M Ekiert
(74) *Attorney, Agent, or Firm* — John P. White; Cooper & Dunham LLP

(57) ABSTRACT

Extrusion of feed materials of a high temperature formable non-ferrous metal susceptible to embrittlement during air processing uses an extrusion system having a rotatable wheel and shoe covering part of the length of a groove around the periphery of the wheel to form an arcuate passageway, the shoe having an abutment which substantially closes a second end of the passageway and an extrusion die spaced from the abutment by a die chamber. The process includes pre-heating the feed material to not less than about 390° C. in a chamber defined by a feeder device, maintaining a protective atmosphere in the chamber of the feeder device while the feed material is heated. The pre-heated feed material then is passed to an inlet end of the passageway, and drawn along the passageway, to be forced by the abutment into the die chamber and through an extrusion orifice of the die to provide extruded product.

28 Claims, 8 Drawing Sheets

(56) References Cited

U.S. PATENT DOCUMENTS

| | | | |
|---|---|---|---|
| 4,041,745 A | 8/1977 | Moreau | |
| 4,044,587 A | 8/1977 | Green et al. | |
| 4,055,979 A | 11/1977 | Hunter et al. | |
| 4,061,011 A | 12/1977 | Green et al. | |
| 4,101,253 A | 7/1978 | Etherington | |
| 4,552,520 A | 11/1985 | East et al. | |
| 4,650,408 A | 3/1987 | Anderson et al. | |
| 5,167,138 A | 12/1992 | Sinha et al. | |
| 5,284,428 A | 2/1994 | Sinha et al. | |
| 5,503,796 A | 4/1996 | Sinha et al. | |
| 7,152,448 B2 | 12/2006 | Zhu et al. | |
| 2008/0264594 A1* | 10/2008 | Lohmueller | B21C 23/005 164/97 |

OTHER PUBLICATIONS

Written Opinion of the International Searching Authority, mailed May 7, 2012 in connection with PCT International Application No. PCT/AU2012/000231, filed Mar. 7, 2012.

International Preliminary Report on Patentability (Chapter II of the Patent Cooperation Treaty), completed Nov. 26, 2012 in connection with PCT International Application No. PCT/AU2012/000231, filed Mar. 7, 2012.

Tonogi, T. et al. (2002). Precise extrusion technology by conform process for irregular sectional copper. *Hitachi Cable Review*, 21, 77-82.

* cited by examiner

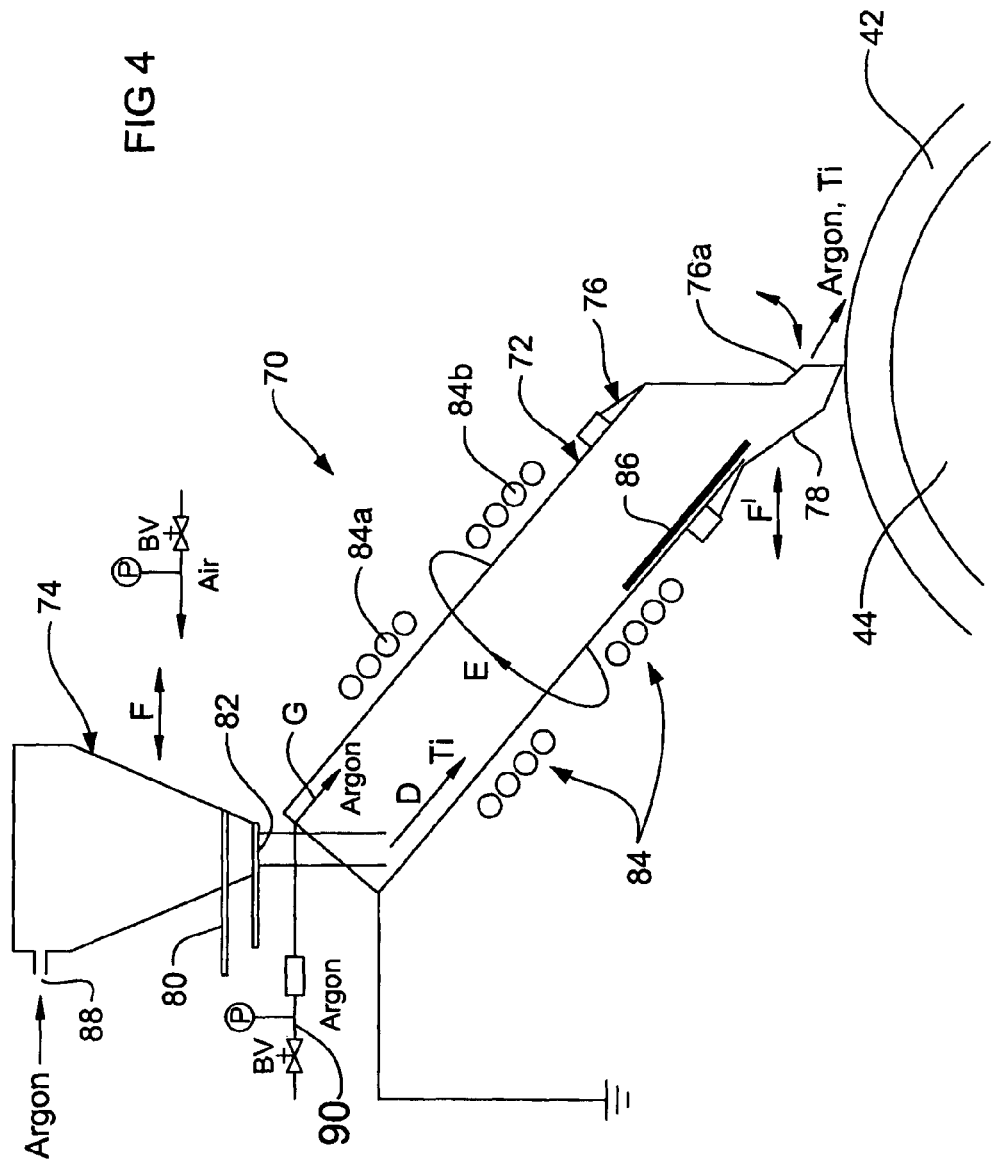

EXTRUSION OF HIGH TEMPERATURE FORMABLE NON-FERROUS METALS

FIELD OF THE INVENTION

The present invention relates to a process and apparatus for extrusion of non-ferrous metals which enable continuous operation. The invention has particular application to high temperature formable non-ferrous metals, such as titanium, tantalum and niobium that are susceptible to embrittlement during processing in air at elevated temperatures. As used herein, reference to a metal such as "titanium" "tantalum" or "niobium" includes the metal and its alloys. The process has particular application for the production of titanium rod and wire, but also can be used to produce other elongate forms of titanium, as well as rod, wire and other elongate forms of other high temperature formable non-ferrous alloys, including but not limited to tantalum and niobium.

BACKGROUND

Titanium wire and rod are extruded from billets produced by the Kroll process. The Kroll billets are batch produced and expensive. Wire and rod milling or extrusion from Kroll billets involve multi-step batch operations which result in low material yields and low product volumes. It would be desirable to be able to use cheaper feed material, in particular titanium powder, recycled chips, sponge granules or the like, and to be able to continuously form elongate titanium product, such as wire and rod, in increased product volume, in less processing steps with increased yields and lower process costs.

Tantalum and niobium are processed via primary and secondary routes. Primary processing is at very high temperatures and requires annealing, melting (or sintering) under high vacuum to prevent reaction with oxygen and nitrogen that diffuse into the matrix and result in embrittlement. The primary route involves the fabrication of billet by vacuum melting methods above 30000 (2415° C. for niobium) or from cold or hot pressed powder that is sintered at 20000 under vacuum. Secondary processing is typically at room temperature with intermediate recrystallisation anneals after about 90% reduction to produce small bars for wire drawing. Conventional processing is thus segmented by batch processes. It would be desirable, therefore, to produce the final tantalum or niobium wire or rod in a single operation in a continuous manner and at lower temperatures.

A known process for the production of aluminium and copper extrusions utilises a continuous rotary extrusion operation. The main process utilising rotary extrusion is the "Conform" process. The Conform process has a number of variants such as those based on Holton and BWE machines but these hold to the same principles of continuous rotary extrusion. A recent variant differs slightly from conventional continuous rotary extrusion in that its primary purpose is to provide severe plastic deformation of feed material without significant alteration of the feed cross section.

The rotary extrusion processes use apparatus of a type consisting of an extrusion system having a rotatable wheel and a fixed shoe which covers part of the length of a groove around the periphery of the wheel, to form an arcuate passageway. The shoe has an abutment which closes one end of the passageway, while a shaping or extrusion die spaced from the abutment by a die chamber defines a die orifice. The feed material at ambient temperature is presented to an inlet to the passageway, at the end of the passageway remote from the abutment, and rotation of the wheel causes the feed material to be drawn along the passageway by frictional engagement with the wheel exceeding frictional engagement with the shoe. The feed material is sufficiently subjected to heat and pressure by the frictional engagements to enable the feed material to be forced into the die chamber by engagement with the abutment and extruded through the die orifice. Examples of variants of apparatus of that type and processes using them are provided in the following US patents:

a) U.S. Pat. Nos. 3,765,216 and 3,872,703 to Green, 4,101,253 to Etherington, 4,044,587 to Green et al, 4,055,979 to Hunter et al and 4,061,011 to Green deceased et al, all assigned to United Kingdom Atomic Energy Authority;

b) U.S. Pat. No. 4,041,745 to Moreau, assignor to Trefimetaux;

c) U.S. Pat. No. 4,552,520 to East et al, assignors to Metal Box Public Ltd Co;

d) U.S. Pat. No. 4,650,408 to Anderson et al, assignors to Babcock Wire Equipment Ltd;

e) U.S. Pat. Nos. 5,167,138, 5,284,428 and 5,503,796, all to Sinha et al, assignors to The Southwire Co; and f) U.S. Pat. No. 7,152,448 to Zhu et al, assignors to Los Alamos National Security, LLD.

Each of these patents disclose continuous extrusion of feed material, of elongate solid feedstock or powder. The metal, when identified, typically is copper and or aluminium or their alloys, with extrusion commencing with feed material at ambient temperature.

While rotary extrusion processes are used for producing lengths of copper and aluminium products, this is not without limits on cross-sectional sizes and other difficulties. However, conditions suitable for operation with copper or aluminium feed materials have not been found to be suitable for use with high temperature formable non-ferrous metals susceptible to embrittlement during elevated temperature processing in air, such as titanium, tantalum and niobium feed materials.

USP '253 to Etherington points to the development of fatigue failure of the wheel due to fluctuating stresses which reach a maximum immediately in front of the abutment member, but falling to a minimum beyond the abutment member. Also, USP '745 to Moreau refers to the large and sometimes prohibitive amount of heat generated by friction between the feed material and walls of the passageway. Also, dead zones can form in the vicinity of the die, while energy yield is small due to absorption of motive energy by heating due to friction. Moreau states that for some metals various drawbacks are serious enough to make the process quite unsuitable. We have found this to be the case when conventional Conform processing is attempted with high temperature formable non-ferrous metals such as titanium, tantalum and niobium that are susceptible to embrittlement in elevated temperature processing in air.

US '979 to Hunter et al affirms the finding of Etherington in relation to straining that the passageway suffers when its walls are subjected to cyclic stressing as the feedstock is compressed. The mechanism is suggested by Hunter et al to be that the pressure/temperature cycle experienced by the wheel as it rotates, resulting in micro fatigue cracks in all the groove surfaces. We believe this problem is exacerbated with titanium, tantalum and niobium, and other metals to which the present invention extends, due to the substantially higher pressure levels necessary for its extrusion. USP '520 to East et al outlines the further problem of metal or "flash" extruded through necessary working clearances near the outlet end of the passageway. In addition to necessitating stoppages for removal of the flash, it increases frictional drag on the wheel and adds to the heat generated by friction and the operating temperature of various parts of the wheel and shoe members. USP '138, '428 and '796 each to Sinha et al attest to considerable heat generated by the enormous frictional resistance and resulting axial stress encountered by the feed material. Also, USP '138 refers to this real disadvantage in the context of stating that the advantages of the conform extrusion machine include the provision of a theoretically continuous extruding process and the use of cold solid or powdered feed material with avoidance of any need to preheat the material prior to its extrusion. That is, the problem of considerable heat generated by enormous frictional resistance despite the feed material mutually being at ambient temperature. Also, the conform apparatus is found according to USP '138 to produce extruded products having non-uniform microstructure and large surface grains which can cause "orange peel" when subjected to high stress working operations. USP '428 and '796 add to this problem recognition that, with extrusion of powder material, the conform apparatus can give rise to the serious problem of uneven powder flow due to flow turbulence and shear forces across the passageway. This is due to the shearing forces being higher along the extrusion shoe, which is fixed relative to the feed material, than along the grooved rotating wheel. Thus, differential cooling along the passageway can be necessary, and this would further complicate extrusion from titanium, tantalum and niobium powders.

USP '448 to Zhu et al extends the range of apparatus providing severe plastic deformation (SPD) by the technique of equal channel angular pressing (ECAP) or extrusion (ECAE). Specifically, Zhu et al proposes apparatus providing operation of the ECAP/ECAE technique with the continuous rotary extrusion enabled by Conform apparatus. The combined apparatus is illustrated as applicable to processing of aluminium bar. While the apparatus is said to be able to be used with any metal or alloy work piece, the degree of efficacy of the apparatus with other metals, such as titanium, and others to which the present invention extends, is not apparent.

Also of relevance is the article "Precise Extrusion Technology by Conform Process for Irregular Sectional Copper" by Tonogi et al, Hitachi Cable Review No-21, August 2002, pages 77 to 82, available at http://www.hitachi-cable.co.jp/en/about/publish/review/_icsFiles/afieldfile/2005/11/29/2_review13.pdf. This work points out that, for metals harder than aluminium, problems such as insufficient tool strength and inferior product quality, have limited Conform extrusions range of application. However, improvements to machinery have made it possible to use Conform extrusion for mass production of copper objects.

SUMMARY OF THE INVENTION

The present invention utilises apparatus of the type described above includes a rotatable wheel, and a fixed shoe having an abutment and a die orifice as detailed above. Feed material of a high temperature formable non-ferrous metal is presented to the inlet at the end of the passageway remote from the abutment, and is drawn along the passageway by rotation of the wheel for extrusion through the die orifice. As with extrusion of aluminium or copper and their alloys in such apparatus, the shoe and abutment attain and are maintained at an elevated temperature by heat generated by friction and shear deformation of the feed material and, to preserve the tooling and allow extrusion to initiate, the shoe and abutment are preheated. However, while such heating enables extrusion of aluminium and copper, subject to some limitations such as cross-section, it does not enable effective extrusion of elongate product of high temperature formable non-ferrous metals such as titanium, tantalum and niobium that are susceptible to embrittlement during processing in air.

According to one aspect of the present invention, there is provided a process for extruding a high temperature formable non-ferrous metal susceptible to embrittlement during processing in air at high temperatures using apparatus including an extrusion system having a rotatable wheel and shoe which is positionable to enable the shoe to cover part of the length of a groove around the periphery of the wheel to form an arcuate passageway having a first, inlet end and a second end, the shoe having an abutment which substantially closes the second end of the passageway and an extrusion die spaced from the abutment by a die chamber; wherein the process includes the steps of: pre-heating the feed material to a pre-heat temperature not less than about 390° C. in a chamber defined by a feeder device, maintaining a protective atmosphere substantially free of oxygen and nitrogen in the chamber of the feeder device while the feed material is heated in the feeder device to the pre-heat temperature, passing the pre-heated feed material from the feeder device to the inlet end of the passageway, and drawing the pre-heated feed material along the passageway to cause the pre-heated feed material to be forced by engagement with the abutment into the die chamber and through an extrusion orifice defined by the die to provide extruded product. The protective atmosphere preferably comprises argon.

In the feeder device the feed material is heated under a protective atmosphere to the pre-heat temperature. The feed material may be presented to the die orifice at a temperature substantially in excess of that solely due to friction and shear deformation. The pre-heat temperature may be substantially in excess of 390° C. and, depending on the form of the feed material, such as in excess of about 760° C. up to about 1140° C. for titanium and up to about 1200° C. for tantalum and niobium. The temperature preferably is in the range of about 800° C. to 1100° C. for each of titanium, tantalum and niobium. However, where ultra-fine grain (UFG) product is required in particular with titanium, a pre-heat temperature not exceeding about 650° C., preferably not higher than 600° C., can be beneficial. Also, where the feed material comprises unconsolidated powder the pre-heat temperature may be from about 400° C. to at least about 850° C., such as from about 775° C. to 820° C.

In another aspect, the invention provides an apparatus for producing extruded product of a high temperature formable non-ferrous metal susceptible to embrittlement during processing in air at high temperatures, the apparatus including:

(a) an extrusion system having:
    a rotatable wheel having a groove around the periphery of the wheel;
    a shoe positionable to cover part of the length of the groove of the wheel to form an arcuate passageway having a first, inlet end and a second end;
    an abutment carried or defined by the shoe for substantially closing the second end of the passageway; and
    an extrusion die carried by the shoe and spaced from the abutment by an extrusion chamber defined by the shoe;
(b) a feeder device which defines a chamber into which feed material is able to be received and from which the feed material is able to pass to the inlet of the passageway of the extrusion system;

(c) a heater associated with the feeder device and operable to heat the feed material while in the chamber to a pre-heat temperature of not less than about 390° C.;

(d) a connection device associated with the feeder device and connectable to a pressurized source of protective gas to enable maintenance of an atmosphere of protective gas in the chamber while feed material is being heated to the pre-heat temperature; and (e) a device for feeding pre-heated feed material from the feeder device to the inlet end of the passageway of the extrusion system whereby pre-heated feed material is able to be drawn along the passageway by rotation of the wheel and whereby the pre-heated feed material is forced by engagement with the abutment into the die chamber and through an extrusion orifice defined by the die to the produce extruded product.

With both the process and the feeder system of the invention, the pre-heat temperature can vary with variation in a number of parameters. These include the specific metal comprising the feed material, the nature of the feed material, the cross-section area of feed material presented to the wall of the passageway, the extrusion ratio, the speed of extrusion and the extent of flash loss of material. In the case of the nature of the feed material, this extends to both the high temperature formable metal chosen, and the physical form of the feed material. Also, while a substantially constant pre-heat temperature can be maintained once steady state extrusion is attained, a higher pre-heat temperature can be beneficial on start-up, with this progressively decreasing as steady state extrusion is approached.

The pre-heat temperature needs to allow for the cooling that can occur as the feed material passes from the feeder device in which the feed material is pre-heated to the inlet for the passageway. As with conventional extrusion of aluminium and copper by the Conform process, considerable heat is generated by friction and shear as the feed material is drawn along the passageway into the die chamber, and extruded through the die. Despite the need for the pre-heating of the feed material, it is necessary as in the conventional Conform process extrusion of aluminium and copper to provide cooling to regulate the temperature at critical locations. Specifically cooling is provided to control the temperature of the abutment which diverts flow from the passageway into the die chamber, and to control the temperature of the die. However, the temperature profile from the inlet to the passageway to the die outlet differs from that obtained by conventional Conform operation for the extrusion of aluminium and copper.

With solid, or compacted powder, rod form feed material, pre-heating of the material may be to a temperature of from about 800° C. to 1100° C. The lower end of that range is preferred for CP and blended elemental mixtures of Ti alloys such as from about 800° C. to 925° C. On start-up, components of the extruder system rapidly heat up to an initial operating temperature, and need to be cooled to retain acceptable steady state temperatures. Examples of such temperatures suitable for titanium rod form feed are set out in Tables 1 and 2.

TABLE 1

Start-up Temperatures (° C.)

|    | Typical | Preferred |
|----|---------|-----------|
| CR | 200-400 | 250-300   |
| SI | 300-450 | 320-400   |

TABLE 1-continued

Start-up Temperatures (° C.)

|    | Typical | Preferred |
|----|---------|-----------|
| A  | 300-600 | 450-550   |
| DI | 300-500 | 350-400   |
| W  | 100-400 | 180-300   |

TABLE 2

Steady-State Temperatures (° C.)

|      | Typical  | Preferred |
|------|----------|-----------|
| CR   | 300-400  | <350      |
| SI   | 600-700  | 600-630   |
| A    | 600-950  | 600-650   |
| DI   | 600-800  | 500-650   |
| W(a) | 250-400  | 250-290   |
| W(b) | 600-1000 | 600-750   |

In Table 1 and 2:
CR designates the coining roll, with the temperatures taken at the roll bearing housing. The coining roll is adjacent to the inlet to the passageway (in use only when extruding from rod forms).
SI designates the shoe insert where forming the die block extension;
A designates the abutment;
DI designates the die insert; and
W designates the wheel, with the temperature W (a) taken about diametrically opposite the abutment and W (b) taken just in advance of the abutment. W (b) is difficult to measure, but generally is about 100-200° C. below the feed material pre-heat temperature.

With the feed material comprising pelletised and unconsolidated powder, the pre-heating temperature may be from about 400 to 1100° C., preferably from about 775 to 820° C. The temperatures at locations within the extruder preferably are as detailed in Tables 1 and 2. Temperatures may be modified to a lower range in the case of titanium such as by temporarily alloying with hydrogen.

In general the temperature ranges of Tables 1 and 2 are suitable for each of tantalum and niobium. However, in each case, the temperature at the abutment can range up to about 1050° C.

To form UFG extruded rod, in particular with titanium typically from as received powders or pelletised powder pre-consolidated to 60 to 90% of theoretical density, preferably 75%, but also from fully solid rod feed, the tooling temperatures may be about the same as set out in the Tables 1 and 2. Powder based feed material may be preheated up to 600° C. in the feeder device for pre-heating, with 400-500° C. preferred. To form UFG extruded rod from fully solid rod feed, enough feed length must be passed through the extruder device at 800-1100° C. to allow a coating or tyre over the extrusion wheel, then rod feed may enter the extruder device at a preheat temperature ranging from ambient to as high as 450° C., but the temperature preferably is from about 370 to 430° C.

Input line speeds during extrusion can be within the capability of conventional Conform extruders for extrusion of aluminium and copper, ranging up to about 0.33 m/s or higher. The output line speeds for a given input speed is controlled by the extrusion ratio (ER, that is, (feed radius)$^2$/(product radius)$^2$) and flash losses. It is found for example that ER values of 0.8, 1, 1.8, 4 and 16 can be achieved in extruding from solid titanium bar of 12 mm diameter, using a BWE 285 Conform machine that has been rebuilt but does not differ in any relevant regard from its original form. ER valves of 0.8 to 4 are possible with the die insert (DI) pre-heat shown in Table 1. An ER value of 16 would benefit from a higher DI pre-heat such as about 600° C. In each case the extruded product was of satisfactory quality, and produced without excessive material loss as flash, giving a product length of ER times the feed length, after allowance from flash.

For CP titanium, processing above the alpha transition temperature of 880° C., such as at about 1000° C., results in a heterogeneous microstructure. With titanium alloys, the transition temperature varies with composition, although apart from beta alloy compositions, a heterogeneous microstructure is also attained when processing in the beta field.

The above indicated ER values from solid rod also can be achieved with consolidated powder rod form feed material and with unconsolidated and pelletised powder feed. In each case there of course is a different respective product length from a given input feed length due to the consolidated powder rod form having less than the theoretical density and unconsolidated and pelletised powder, which have an even lower mass density.

With rod form feed material of consolidated elemental alloy powder, or unconsolidated elemental alloy powder, processing results in an heterogeneous microstructure. The predominance of CP titanium as a ductile matrix dominates the extrusion behaviour of elemental titanium alloy powder. This is due to the CP titanium content, as alloy additions remain substantially as undissolved secondary particles until they are removed by a subsequent homogenisation anneal and the extrusions take on the properties of the alloy material. Consolidated and unconsolidated alloy powder of each of titanium, tantalum and niobium differ from elemental alloy powder in that the chemistry of the powder starts off with the alloy chemistry and homogeneity. The alloy chemistry and hence alloy properties in both these cases will alter the optimum extrusion preheat temperature, extrusion strain and strain rate necessary for quality product, but the same general rules apply as for fully solid alloy rod feed.

Powder for use in the present invention, such as that of titanium, tantalum and niobium, whether consolidated into rod form feed material or as unconsolidated feed material, may be of a range of different types, or even a mixture of at least two types. In the case of titanium, the powder may comprise titanium hydride, titanium hydride/dehydride (H/DH), titanium sponge, atomised powder, pelletised powder, granules and sponge granules, and other forms of particulate titanium feed, including recycled feeds of appropriate purity. H/DH, sponge-like powder and pelletised feeds have been found to be well suited for use in the present invention. The feed material most preferably has a low chloride content, such as less than 100 ppm Cl, to eliminate porosity in the extruded product. However, for applications such as remelting the product wire under high vacuum as with additive manufacturing devices, chloride levels may not need to be so restricted.

With each form of feed material for the present invention, the metal may be any of the generally recognised grades, such as ASTM grades 1 to 4 for commercial purity (CP) titanium, and/or any of the grades 5 to 38 titanium alloy compositions, or alloy containing high amounts of titanium such as the near 50 atomic percent shape memory alloy TiNi. In the case of consolidated or unconsolidated powder, extruded product of such titanium alloy grade can be produced from a powder mix of appropriate proportions of master alloy and elemental powders; such as 60 wt. % Al-40 wt. % V alloy powder blended with CP titanium powder. Consolidated or unconsolidated powder may also be of the form of alloy powder. In each form of the feed material, it may comprise or provide an alpha, alpha-beta or beta alloy.

(a) Powder Feed Material

The primary purpose of a powder feeder device is to deliver regulated free flowing powder feed material, heated up to a temperature as high as about 1000° C. (in order to lower the flow stress of titanium, tantalum or niobium) to near the apex of the grooved wheel with minimal contamination to the product. The secondary purpose is to deliver the heated powder feed material in an occupationally safe manner that does not result in fire or explosion.

The feeder device may deliver the powder feed material to the wheel groove in a radial manner (such as by direct gravity feeding) or in a tangential manner (such as by a vibratory feeder). However, to maintain a regulated flow and provide heating to the titanium, tantalum or niobium powder, an intermediate feed delivery can be employed, allowing a tilt adjustment. A hopper containing a sufficient quantity of powder feed material may travel with a kiln as the latter is tilted. The hopper can also be elevated, whilst maintaining its angle with the kiln, to alter the depth of the powder pile in the kiln that emerges from the shoe-shaped spout at the discharge of the hopper.

In one form, the feeder device may include an adjustably inclined tubular rotary kiln having a heating device by which powder feed material is able to be heated as it passes from an inlet end to an outlet end. The powder preferably is guided by a spout, which has a shoe-shaped dome at its end, for flow from the outlet end of the kiln, to a location in the groove of the rotating wheel which is adjacent to the inlet end of the passageway. The feed device may be in the form of a feed hopper operable to supply powder feed material to the inlet end of the kiln via a shoe-shaped hopper discharge, to enable the material to flow along the kiln and pass, from the outlet end of the kiln, to the inlet of the passageway via a spout hopper. The system comprising the kiln and the feed and spout hoppers further includes a heating device or furnace and is connectable to a source of inert gas. The system is tiltable through a suitable angle from horizontal, such as from 2° to 45°, to allow variation in the speed of powder flow along the kiln, to raise the inlet end relative to the outlet end. The spout hopper may be fixed relative to the kiln and extend forward at an angle of about 5° from the vertical and be shaped such that a shoe-dome is at its end to charge the powder forward and allow the powder to slide unobstructed. The lower surface of the spout hopper traces the surface contour of the grooved wheel with a gap of no more than about 0.5 mm. The entire feeder unit may be modular and be set at the feed end of the extruder at an appropriate height and position to allow powder feed material to a location in the groove of the rotating wheel, which is adjacent to the inlet end of the passageway.

The kiln preferably is connectable to a source of a protective or inert gas, such as argon, to enable the gas to maintain slight over-pressure in the kiln, thereby to protect the powder from exposure to oxygen and nitrogen in the course of being heated. The inert gas preferably is supplied to the inlet end of the kiln, so as to flow co-currently with the powder. With this co-current flow, the inert gas is able to discharge with the powder from the spout hopper. This provides protection for the heated powder as the powder is drawn into the passageway, and remains until expelled as the powder is consolidated, by minimising exposure of the powder to oxygen and nitrogen.

The kiln may be made of a range of suitable materials. One suitable material is steel, preferably stainless steel, such as ferritic stainless steel. However, suitable steels are limited to a maximum powder heating temperature of about 1000° C. due to reactions with the feed material, such as a titanium-Fe eutectic reaction. Alternatively, the kiln may be made from, or lined with, silica, partially stabilised zirconia or with other material that does not chemically react with the feed and is thermally shock resistant such as a suitable ceramic material.

The feed hopper also may be connectable to a source of supply of protective gas, such as argon. This initially is to flush other gases from the feed hopper. However, with discharge of powder feed material from the feed hopper to the rotary kiln, the protective gas is able to flow from the feed hopper with the feed material, and into the kiln, precluding the risk of ingress of atmospheric air and contamination by oxygen or nitrogen.

Powder feed material may be stored in the feed hopper, which preferably is a gravity hopper with a hopper angle determined according to the powder flow properties. A funnel deck may be added to the interior of the hopper to act as a lining to allow flow according to the flow properties of the powder if the hopper angle has been determined according to a powder of a different type. Otherwise the hopper may be equipped with vibrating tappers to prevent bridging of powder that may occur due to the use of titanium, tantalum or niobium feed material with flow properties differing from powders used to determine the hopper angle or funnel deck. Protective gas such as argon can be fed at the top of the feed hopper and is fed at the upper, inlet end of the rotary kiln. A control system preferably ensures that the kiln cannot begin to rotate, be heated or be fed with feed material until the protective gas flow has reduced oxygen contents below an alarm setting. For example, in the case of titanium powder feed material, an oxygen level of 4 volume % will allow titanium to burn, and the alarm setting must be well below that level.

The feed hopper preferably has a sliding gate that fully opens only after protective gas flow has sufficiently lowered oxygen levels within the rotary kiln and a secondary sliding gate may then be adjustable to regulate the flow of feed material into the top of the kiln. The control system preferably ensures that the adjustable sliding gate is not able to open until the kiln is sufficiently heated and that heating does not commence until rotation of the kiln has been initiated to allow sliding bearings to take up movement due to kiln expansion.

Both protective gases such as argon and titanium, tantalum or niobium powder feed material are fed into the cold top section of the rotary kiln. Feed material preferably is fed at a lower point than the protective gas to prevent the gas from disturbing the feed material powder and creating a powder cloud. A powder cloud may break containment at the discharge point above the grooved wheel and pose an explosion risk, while it also lowers the efficiency of mass transfer.

When powder feed material is heated in the absence of air, such as above 600° C. in the case of titanium, it may sinter and stick to itself, especially in the presence of external stress, thereby hindering free powder flow. However, by delivering the powder feed material from a feed hopper at ambient temperature to the interior of the rotary kiln, the shearing action of the rotation as well as the force of gravity allows the continuous flow of powder and allows it to fall into the spout hopper to be delivered to the grooved wheel. The shearing action also allows for the feeding of powders or particulates of various size distributions and morphologies. The rotation and tilt angle also regulate the mass flow of the powder and thermal transfer to the powder. A preferred kiln tilt angle of 2° allows a steady powder level through the kiln. A preferred outlet of the spout hopper is as close to vertical as possible to provide free movement of the powder into the groove of the wheel. The ability to tilt the kiln at greater angles allows for the alteration of thermal and mass flows for a variety of powder types with differing flow properties. At the conclusion of powder flow, a scraper located beneath the shoe-shaped hopper discharge can be slide forward to clear the kiln of any residual powder.

Both the feed hopper and spout hopper preferably are held stationary relative to the rotary kiln. A sliding gas seal is formed at the feed hopper end at the inlet of the rotary kiln and the spout hopper encloses the discharge end of rotary kiln whereby the rotary kiln remains tiltable due to a flexible connection between the kiln and spout hopper. The spout hopper then forms a sliding seal with the grooved wheel of the extruder. The overpressure of protective gas in the hoppers and in the kiln acts to prevent the ingress of ambient atmosphere.

Once the powder feed material leaves the feed hopper it moves by shearing action from the cold section of the rotary kiln to the hot section, the residence time of the powder dictating its final temperature. The receiving angle of the spout at the discharge of the rotating kiln is at least the same as the feed hopper angle, but is preferred at 5° from the vertical. This angle, and the additional tilt provided by the kiln prevents powder hang ups in the area. However, a lump breaker consisting of a rod or blade that can be elevated or lowered within the spout hopper allows for the breaking of partially sintered lumps. The application of a tapper at the spout hopper further breaks up any agglomerates that may form by sintering, and may take the form of a vibratory mesh, particularly for combinations of finer powders and higher temperatures, but is usually not required. The tilt of the spout hopper may be fixed relative to the tiltable kiln with the kiln discharging into the fixed spout hopper. This allows a constant receiving angle of the spout and permits discharge from the spout for powders with lazy flow behaviour. Further, regulated protective gas inputs to the hopper also minimises a pressure drop from the top to bottom of the hopper, enabling even drop-down of the powder pile. The spout hopper preferably forms a leaking seal over the wheel that allows additional build up of protective gas back pressure within the kiln. The spout hopper and its spout preferably are also thermally insulated to prevent heat loss and may also be additionally heated.

Heating of powder feed material can be by use of a variety of different heaters, depending on the material of construction of the rotary kiln. The heating may be by, radiative heating or by using any other continuous heating method or system. In one convenient arrangement, heating may be conducted at two or more locations along the length of the kiln which preferably are located away from a relatively cool inlet end, towards the outlet end, of the kiln.

The entire feeder assembly and its components are all at the same earth potential as all other components, are interlocked to shut off mass flow in the event of protective gas loss enabling an unacceptable increase in oxygen volume percentage, and the control system may include sensors for monitoring the oxygen content in the assembly.

(b) Rod Form Feed Material

Rod or bar form of feed material may be of solid metal or of consolidated powder of in excess of 60% of the theoretical density. In each case the elongate feed material may be fed to the extruder apparatus either as isothermally, or as continuously, heated lengths. The heating may be by using a RF induction heating arrangement, continuous electric resistance heating or using any other continuous heating method or system. The rate of heating preferably is tuned to the throughput of the extruder apparatus. The heating may be conducted with the elongate feed material held in a suitable containment vessel. The interior of the vessel first is flushed with a protective gas, such as argon or other inert gas, and with the elongate material positioned in the vessel, a positive pressure of the gas is established, and heating is commenced.

A silica tube may act as a containment vessel for protective gas, such as argon, to stop the feed material from reacting with oxygen and nitrogen at high temperatures. Protective gas is particularly necessary for rods of consolidated powder feed material that are porous and susceptible to high penetration of interstitial contamination. The feed material also does not react excessively with a silica vessel at temperatures up to 1100° C. for the preheat exposure times allowing the feed material to be transported freely by sliding without sticking to the vessel walls. Other materials could be used for manufacture or lining of the containment vessel, as long as they did not react excessively with the metal of the feed material and its alloys and can tolerate the temperature variations involved in preheating and feeding.

Rod forms when isothermally or continuously heated within the containment vessel are delivered to the extruder apparatus. A feeder unit preferably feeds lengths of rod forms to that apparatus for continuous extrusion. Rod forms of consolidated powder may be loaded into a cold loading zone as suitable lengths, with protective gas purged and then loaded into a hot zone for preheating. The feeding of these consolidated powder lengths may be automated, with continuous feed to the hot zone at volume through puts that match the extrusion output of the extruder apparatus. The extruded product from extrusion of rod forms of consolidated powder is able to be fully dense or very close to fully dense and with no apparent remnant of joining between successive lengths. Feed rods of solid feed material also are able to be fed as continuous lengths, so a feed valve and flushing chamber need not be used. The rod forms of each type are to be left in the hot zone until heated through. The dwell time to the environment temperature allowed the lengths of consolidated powder to partially sinter and be at first pushed and then dragged through the extruder as a single length. As the feed exits the hot zone and enters the rotary extrusion tooling, the oxygen in the neutral atmosphere may rise slightly to about 30 ppm. A counter flow of protective gas such as argon through the tooling may be introduced to further reduce interstitial contamination during the period the sliding gate is open.

To ensure homogenous product the variation in the preheat temperature along the feed length preferably is <±50° C. for feed material, such as CP titanium, preferably ±20° C., until a steady state prevails.

The rod-form feeding system is interlocked to maintain a neutral protective atmosphere with oxygen levels below 4 volume % (for fire prevention) and 0 to 32 ppm to minimise contamination in the product to not more than a mild surface blueing.

(c) Extruder Apparatus for Powder Feed

The extruder apparatus can be of a variety of forms, such as detailed in the prior art discussed above, including the ECAP/ECAE variant of USP '448 to Zhu et al. However, some adaptation is necessary or desirable to facilitate use of the extrusion apparatus in the context of the process and extruder system of the present invention.

As indicated, the feeder device for powder feed material may discharge close to or forward of the apex of the grooved wheel. In order to fit the powder feeder device to a BWE Conform type of machine and to allow feeding at the wheel apex, any coining roll housing preferably is removed. In one arrangement, a clamping plate assembly is attached to a top plate that is mounted to the frame of the extruder apparatus. The clamping plate assembly may be grooved and provide room for the powder feeder device to function. Also, the clamping plate assembly can act as a loading point for the clamping of the shoe of the apparatus. The clamping plate also can allow the introduction of a counter flow of protective gas. A hole in the clamping plate allows for the positioning of the spout hopper.

The spout hopper and the groove in the clamping plate can allow for flood feeding by constraining the spread of the powder above the wheel and keeping it in the wheel groove and directed under shoe inserts. A tongue at the rear of the spout hopper intrudes into the wheel groove and allows only forward movement of powder. The lower edges of the spout hopper may trace the surface contour of the wheel with a tooling gap such as of ~0.5 mm, which also minimises powder spillage and loss.

The shoe inserts may be of usual form. The gaps between the shoe inserts and the wheel are the same as usual for extruding from rod forms, with 0.5 mm or less the flash gap to minimise powder loses prior to consolidation and maximise tyre formation over the groove. A tongue on the leading end of the entry block preferably is removed for the powder feed to maximise the receiving volume to the consolidation zone. The shoe insert tongue in this case performs the function of compaction of the powder onto the surface of the wheel groove in order to form a good frictional interface. This allows the compacted powder to be driven forward to the die chambers tooling.

It may prove advantageous to install a coining roll in the groove of the clamping plate in the vicinity of the spout hopper to maximise the chances of tyre formation, particularly for spherical particles that of any morphology have the highest flow rate, lowest residence time and lowest surface area for inter-particle locking during compaction. This can be achieved readily enough by exchanging the clamping plate assembly or modifying the shoe inserts for a coining roll. A driven coining roll would also provide positive inertia to the powder to allow forward movement into the groove and lessen powder spillage.

Because the clamping plate encloses the powder feed above the wheel, it is a simple matter to direct additional streams of protective gas, such as argon, to ensure atmosphere protection of the powder is maintained. The frame area around the extrusion wheel preferably is encased in baffles to ensure a positive pressure of the gas is supplied around the wheel during extrusion.

(d) Extruder Apparatus for Rod Form Feed

As with the use of powder feed material, the extruder apparatus for rod form feed material can be of a variety of forms, such as detailed in the prior art discussed above, including the ECAP/ECAE variant of USP '448 to Zhu et al. Again, some adaptation is necessary or desirable to facilitate use of the extrusion apparatus in the context of the process and extruder system of the present invention. In reference to a BWE configured Conform device, the important components of the extrusion apparatus are the (i) grooved wheel, (ii) shoe inserts, (iii) abutment/die chambers, (iv) coining roll and (v) scraper blades. The critical tooling component of the abutment tooling most preferably is manufactured from super alloy, tungsten rhenium alloy, or other material that can withstand high stress and temperatures up to 700° C. to minimise tooling deformation and wear.

(i) The grooved wheel may be fabricated from tool steel, such as H13 tool steel. The groove may be a smooth U-shaped groove, such as about 15 mm deep and about 13 mm wide to be suitable for receiving 12 mm diameter rod feed. The "stickiness" of high temperature formable non-ferrous metal, such as titanium, tantalum or niobium preheated to ≥580° C. is sufficient to allow adherence of the feed material to the wheel and the formation of a tyre of the feed material in the wheel groove, as is highly beneficial in achieving successful extrusion (ii) During extrusion the shoe insert tooling can heat to a temperature as high as 700° C., and it preferably is manufactured from a high temperature resistant material, such as Rene 95 super alloy. Inserts manufactured from H13 steel were found to be sufficient for runs totaling only tens of meters of product. The temperature of the shoe inserts may be regulated by controlled application of a cooling fluid to the rear of the tooling inserts. The shoe inserts have a tongue that protrudes into the wheel groove that has side clearance of 0.5 mm. The tongue of the entry block serves to straighten and guide the rod to the groove. The function of a die block extension tongue is to deform the rod feed more firmly into the groove to increase the frictional interface between the feed and the wheel groove. It does this by having a taper that decreases the distance between the top of the tongue and the bottom of the wheel groove the closer the feed gets to the abutment. The tongue of the entry block is essentially superfluous when extruding from rods of compacted powder as the coining roll forms these functions. The entry block may be slotted to allow the lowering of the coining roll to the bottom of the wheel groove. The clearance for feeding between the entry block tongue and wheel groove may be about 12.3 mm decreasing to about 12 mm for the groove dimensions detailed above. Similarly, the feeding gap between the die block extension tongue and wheel groove may be about 12 mm decreasing to 8.0 to 10 mm. The clearance of the sides of the entry block shoe insert and the top of the wheel may be about 1.0-2.3 mm decreasing to 0.5 mm and the clearance between the die block extension shoe insert and the top of the wheel maybe about 0.5 mm.

(iii) The abutment/die chambers tooling may be manufactured as a single piece for optimum heat dissipation of the abutment, but preferably the abutment may be used as an insert into the die chambers. The temperature of the abutment can be regulated by controlled application of a cooling fluid to the rear of the abutment. The abutment tooling preferably is manufactured from high strength high temperature resistant material such as Rene 95 super alloy, or a tungsten-rhenium alloy such as W-25% Re-4% (HfC) for high hot strength. Similar high temperature stable materials should suffice, including magnesia partially stabilised zirconia, which is also reasonably chemically stable with titanium and other high temperature formable non-ferrous feed materials, such as tantalum or niobium, susceptible to embrittlement during processing in air at high temperatures. Wear resistance is more critical for the die chambers than high strength, so Rene 95 die chambers most preferably have wear facing inserts such as of magnesia partially stabilised zirconia (Mg-PSZ) or a coating of partially stabilised zirconia, or another wear resistant layer with low reactivity with titanium and other feed materials, such as tantalum and niobium and a good thermal and lattice match to the super alloy. The Rene 95 abutment and die chambers tooling preferably is subjected to a subsolvus solution treatment and aged to produce a precipitation hardened and fine grained microstructure for the optimum strength and wear resistance. The clearance between the wheel and the die chambers should be set between 0.1 mm and 0.5 mm (flash gap), preferably 0.3 mm. The reduction die, or die insert inside the die chambers, preferably was a 120° included angle for titanium or 45° included angle for tantalum and neodymium, and may be manufactured from a tool steel, such as H13 tool steel. Hard facing of the insert die about the included angle and land improves product quality and tool longevity.

(iv) The coining roll preferably is manufactured from a tool steel such as H13 steel, and adjusted such that the coining roll could be lowered as far as geometrically possible to the bottom of the wheel groove. Forced cooling of the coining roll bearings is also preferred.

(v) The scraper blade surfaces responsible for removing flash may be manufactured from H13 tool steel, but this is only good for tens of meters of extrudate product, so should be preferably manufactured from a superalloy, such as Rene 95, or coated with a wear resistant layer, such as PSZ or other hard wear resistant layer with tolerable reactivity with titanium and other feed materials, such as tantalum and niobium. The gap between the scraper blades and the top of the wheel should be the same as the gap between the die chambers near the die insert orifice and the top of the wheel or preferably 0.125 mm greater. If the gap between the die chambers and the wheel is greater than about 1.1 mm, there is danger of the tyre being pulled free of the wheel groove by the scraper blades and the wheel ceasing its rotation due to seizing.

Extruding rod forms of cold isostatically pressed (CIPped) or otherwise pre-compacted powders requires adjustment of the gap between the coining roll and bottom of the grooved wheel to allow hot compaction of the rod to 75-100% density, preferably 100%, and to achieve sufficient frictional interface of the rod with the wheel groove to enable the rod to be driven forward to the abutment and extruded through the die insert.

(e) Extrudate Discharge

With each type of feed material, the extrudate is at a temperature in excess of 600° C. when it exits the die. The extrudate requires cooling, maintenance of atmosphere protection and isolation from the operators. To fulfil these functions, an elongate discharge vessel filled with flowing protective gas, such as argon preferably is employed as an outlet from the extruder assembly. The extrudate can be grabbed once it safely exits the discharge vessel and is at a cool enough temperature. Once grabbed it can, be placed under tension to keep it straight and spooled without either excessive surface contamination or danger to the operator.

The discharge vessel may be filled with a flowing protective or neutral atmosphere, such as argon, to minimise contamination. The discharge vessel has a length such that the need for forced cooling within the vessel is removed or delayed until the extrudate is at a sufficient low temperature. This allows for suitable venting of steam and possible hydrogen formed from water dissociation if forced cooling by water is used beyond the discharge vessel. Alternatively, water may cool the exterior of the vessel and hence the extrudate product thus in contact. Titanium can react with water based coolants and such coolants can contaminate the titanium with hydrogen and cause surface oxidation. Above 700° C. explosive combustion of dissociated hydrogen is possible. Steam can also travel back up the line and the hydrogen evolved can react with the powders and contaminate the product. Thus, a contained protective, neutral gas atmosphere arrangement needs to be employed. The discharge vessel may have a clamped gas seal that can be opened and the discharged vessel moved away if required. Such a protective neutral gas atmosphere is desirable with extrudate of all non-ferrous high temperature formable feed material.

In order that the invention may more readily be understood, description now is directed to the accompanying drawings in which.

Figure 2:
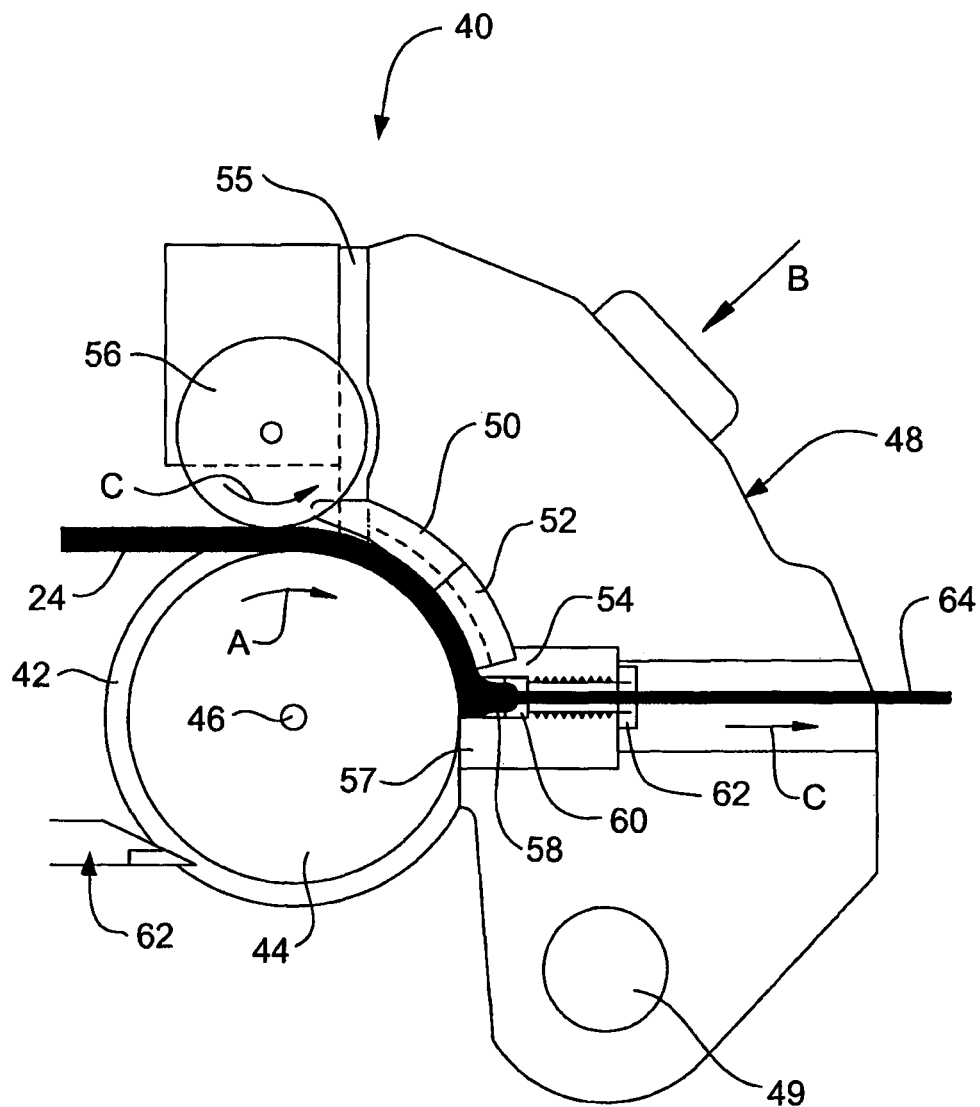
FIG. 2 is a central sectional view through an extruder assembly for operation with a feeder device as in FIG. 1.
Figure 3:
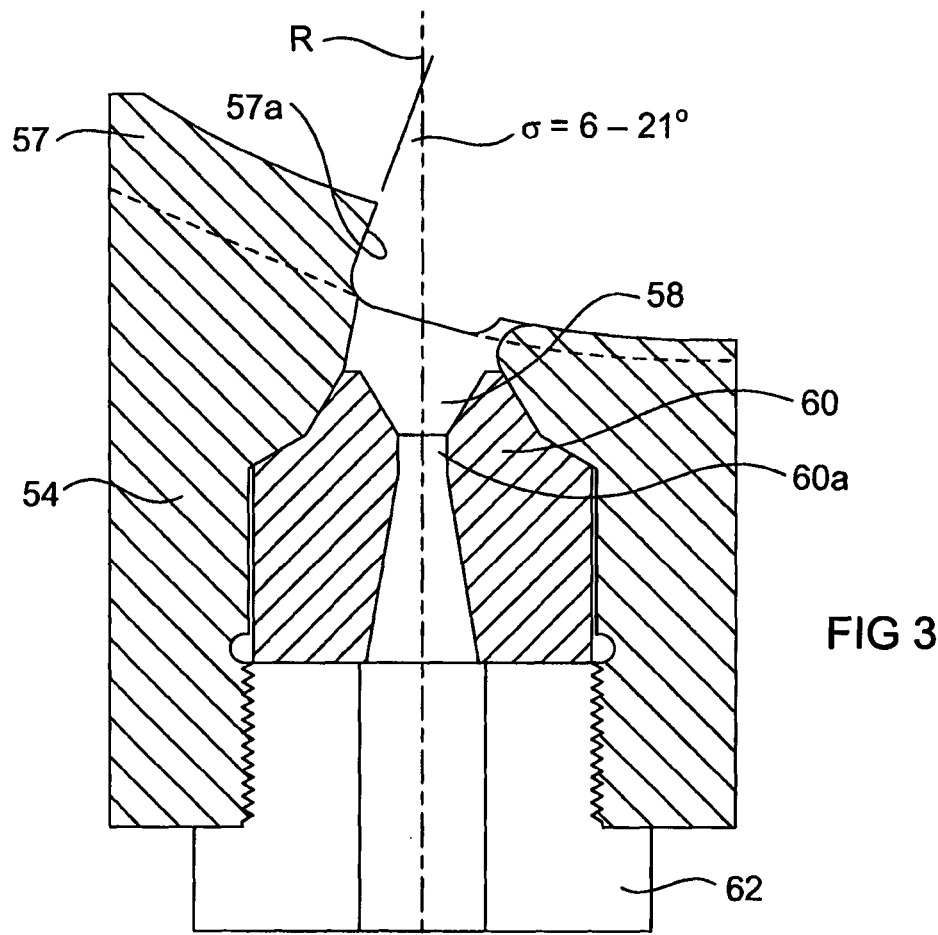
FIG. 3 is a central sectional view of the abutment/die chamber of the assembly of FIG. 2, shown on an enlarged scale.
Figure 3A:
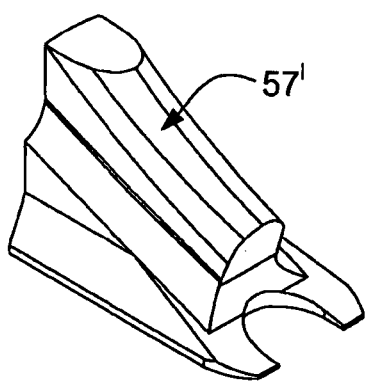
Figure 3B:
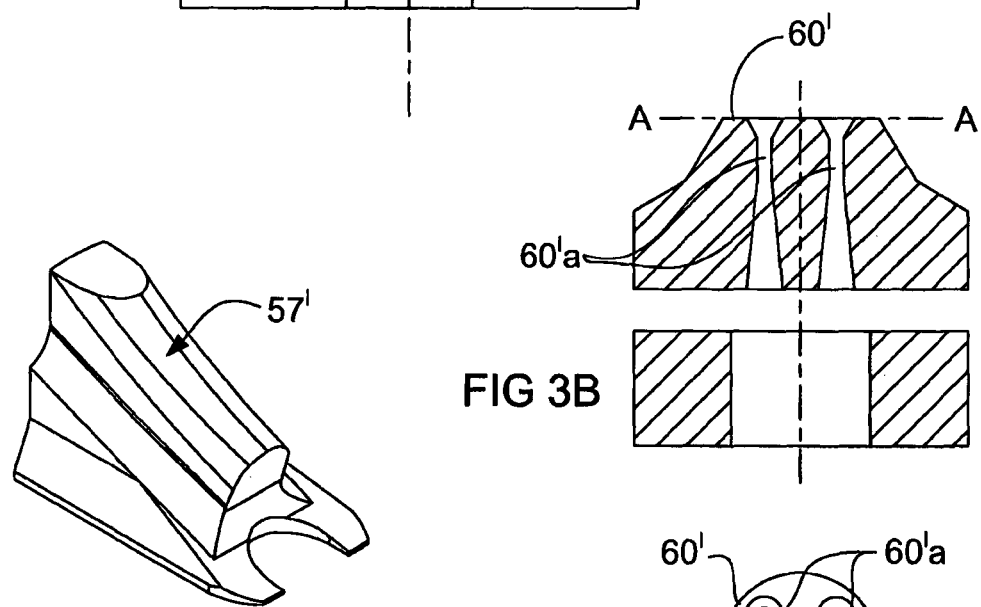
Figure 3C:
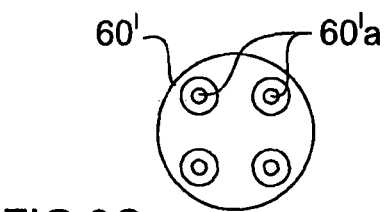
Figure 5:
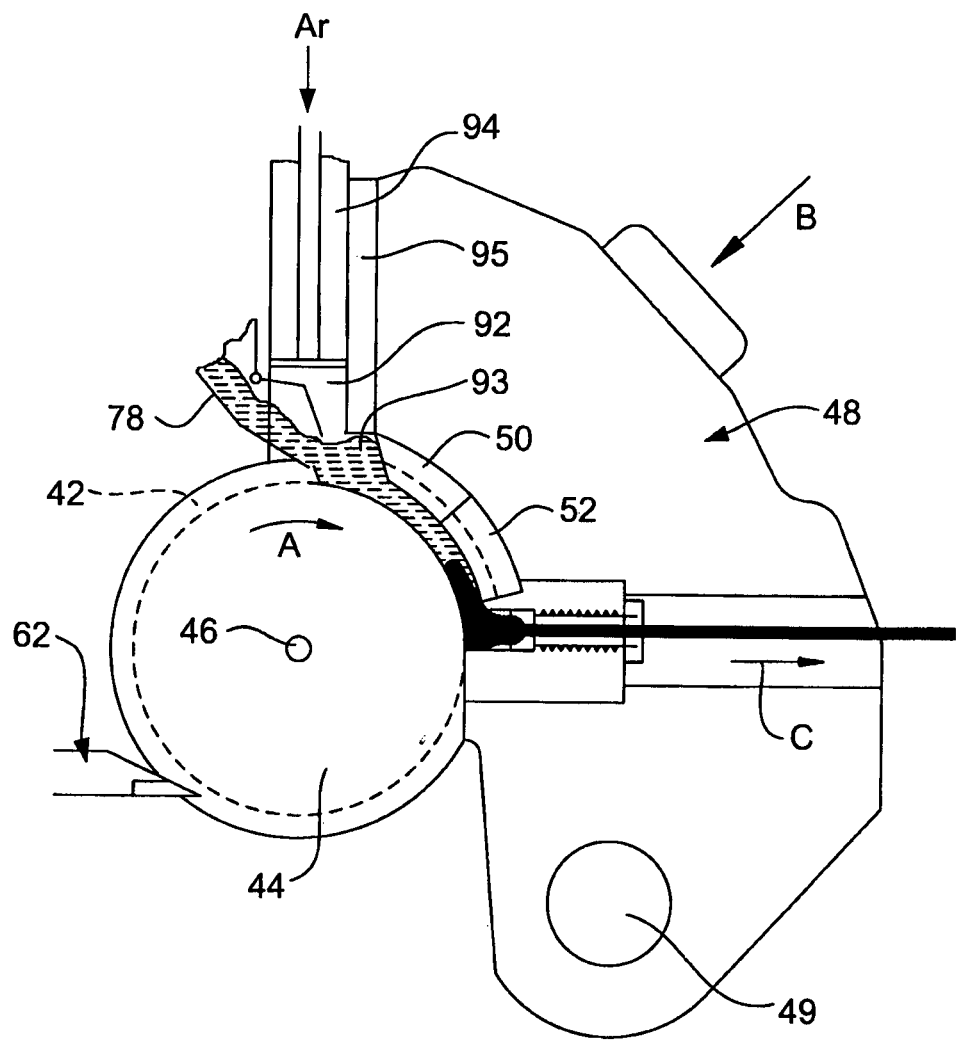
Figure 6:
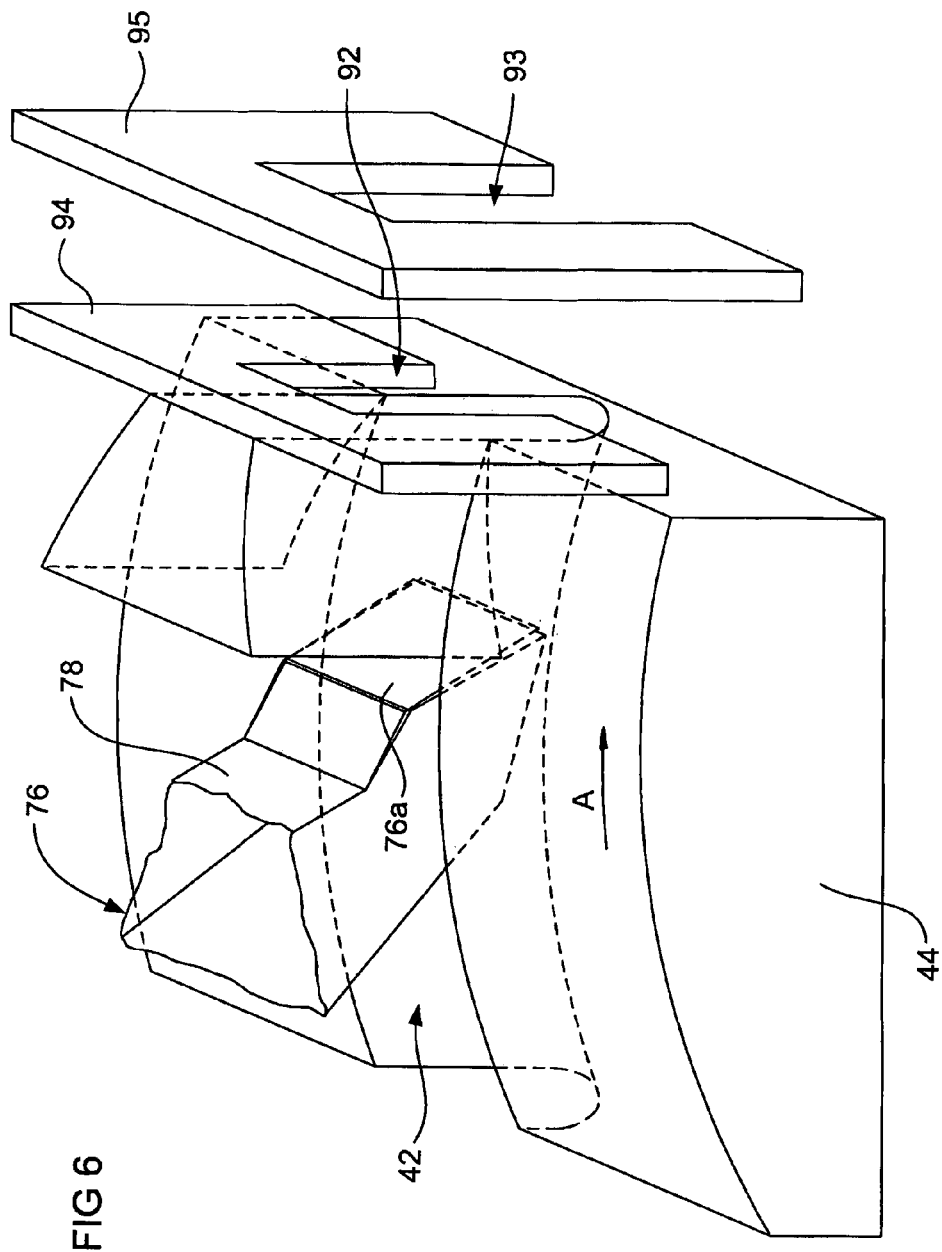
Figure 7:
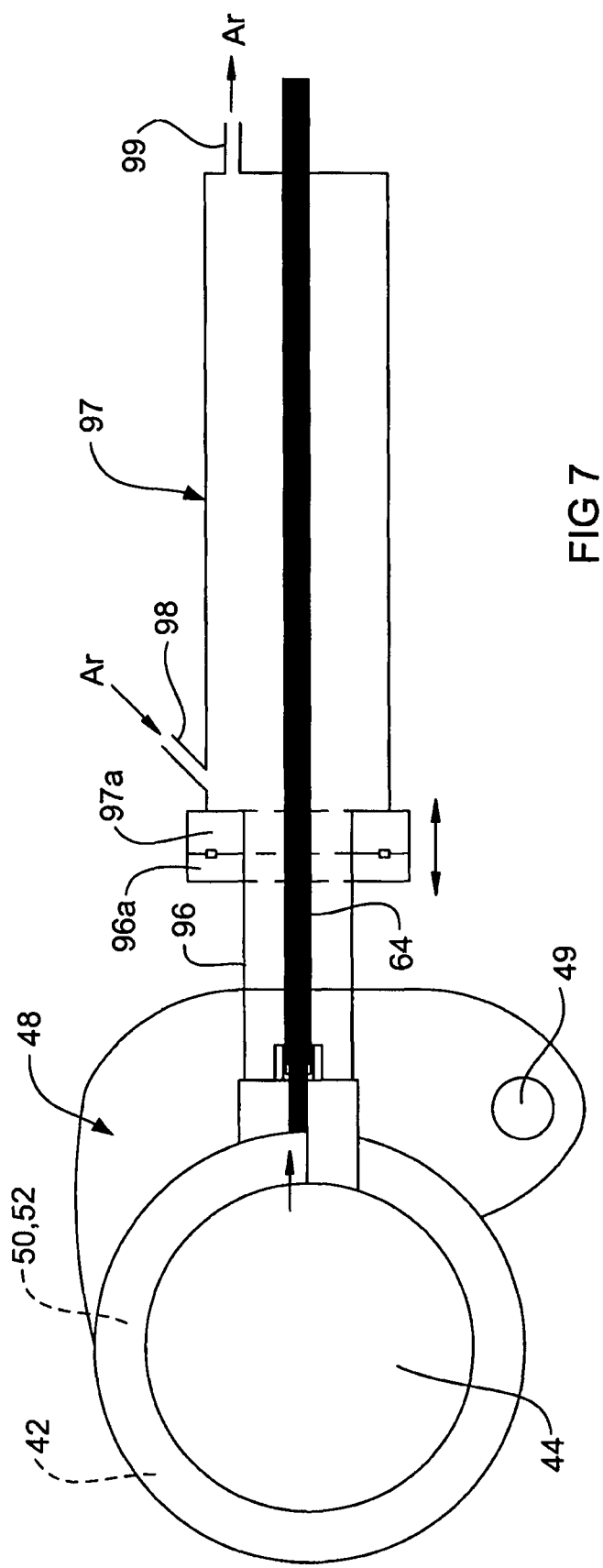
Figure 10:
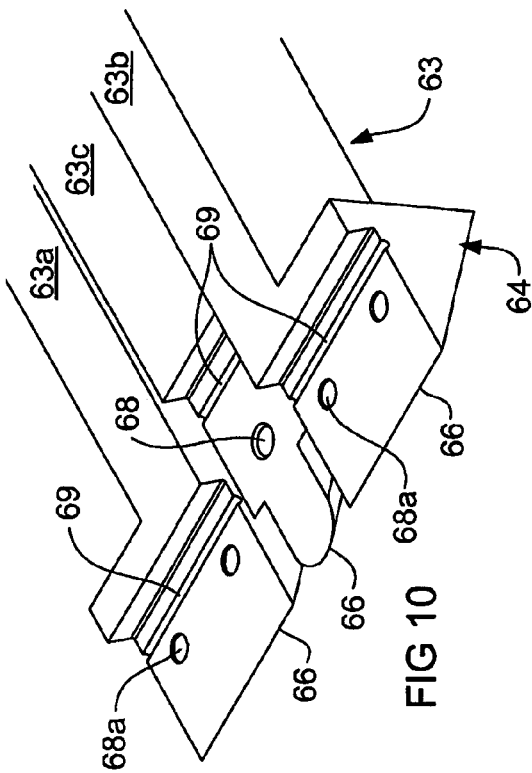
Figure 11:
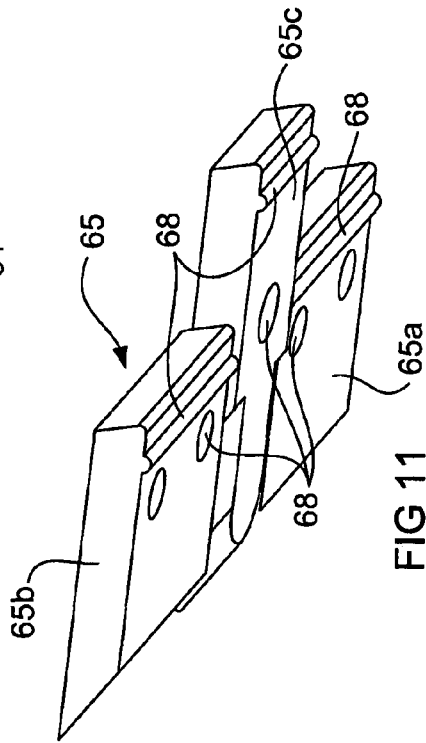
Figure 8:
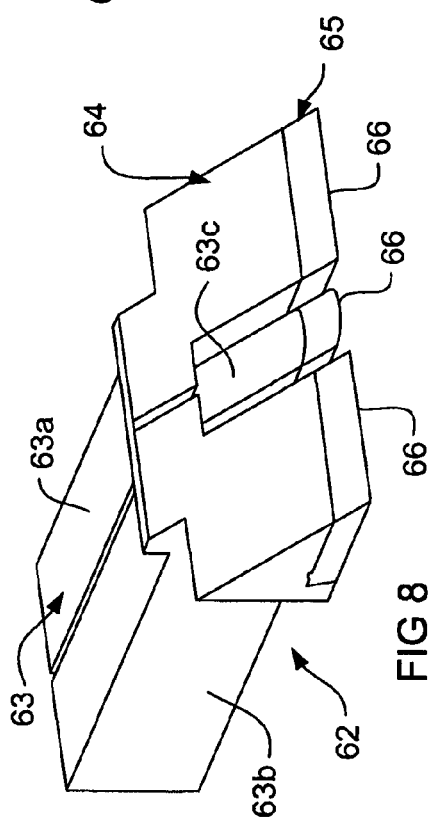
Figure 9:
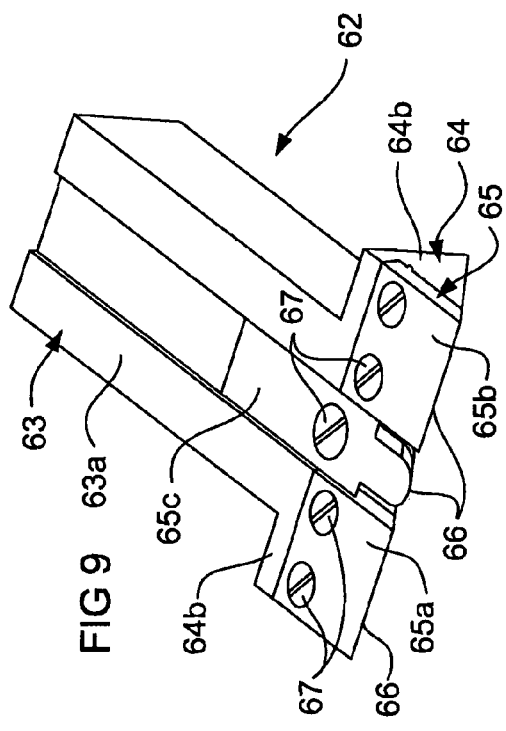

FIGS. 3A, 3B and 3C also show respective isometric views of an abutment insert and a multi-strand version of a die insert used to extrude multiple wires of narrower diameter;

FIG. 4 is a schematic side elevation of a powder feed material feeder device;

FIG. 5 corresponds to FIG. 2, but with the assembly set up to receive powder feed material from the device of FIG. 4;

FIG. 6 is a partially exploded schematic in the perspective view of detail of the arrangement of FIG. 5;

FIG. 7 is a schematic representation of the extruder assembly of FIG. 2 or FIG. 5, illustrating the arrangement for exiting extruded product;

FIGS. 8 and 9 are respective perspective views of a scraper device used with the extruder of FIGS. 2 and 5; and FIGS. 10 and 11 are perspective views of respective components of the scraper device of FIGS. 8 and 9.

Figure 1:
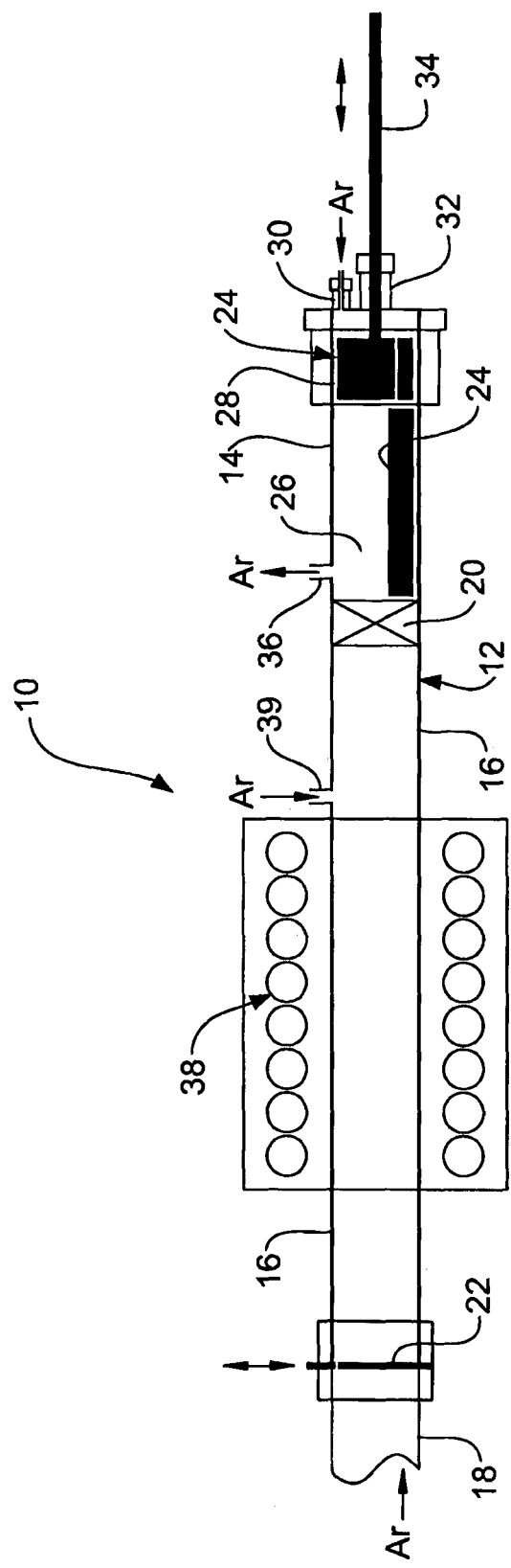
FIG. 1 is a schematic side elevation of a feeder device for delivering to an extruder assembly rod form high temperature formable non-ferrous metal feed material, such as titanium, tantalum or niobium.

With reference to FIG. 1, the feeder device 10 shown therein operates by receiving rod form non-ferrous, high temperature formable feed material, such as titanium, tantalum or niobium feed material at the right hand end. The feed material progresses through the device 10 and ultimately issues from the left hand end and enters extrusion assembly such as shown in FIG. 2.

The device 10 has an elongate tubular vessel 12 which has successive sections able to be isolated from one another. The sections comprise an unheated, or cold loading zone 14, into which feed material initially is received, an intermediate hot or heating zone 16, and an outlet zone 18 from which feed material passes to the extruder assembly. Zone 14 is able to be isolated from zone 16 by a feed valve 20, while zone 16 is able to be isolated from zone 18 by a sliding gate 22. The loading zone 14 is adapted to hold feed material 24 in an atmosphere of protective gas such as argon. The zone 14 has a flushing chamber 26 in which the material 24 is able to be isolated while exposed to the protective gas. The inlet end of the zone 14 has an airlock 28 through which material 24 is receivable, while feed valve 20 separates zone 14 from zone 16. Airlock 28 has a connector 30 connectable to a pressurised source of the protective gas (not shown), as well as a sleeve 32 through which a push rod 34 extends. A continuous flow of protective gas, maintaining a slight over-pressure in airlock 28 when closed and in chamber 26, is able to be provided via connector 30, with the gas discharging, under control maintaining the over-pressure, via an outlet 36 from chamber 26. The over-pressure in chamber 26 assists in maintaining a protective atmosphere within zone 16, during opening and closing of feed valve 20. Also, with rod form material 24 of compacted powder, it assists in flushing air from the porous feed material. The maintenance of a protective atmosphere in zone 16 is otherwise ensured by inlet 39 connected to a pressurised source of protective gas (not shown).

The airlock 28 is able to hold a supply of rod form lengths of feed material 24. When required, the lengths are advanced in turn by push-rod 34, from airlock 28, into chamber 26 and ultimately through valve 20 and into heating zone 16. A heater 38 is associated with zone 16 and is operable to heat each length of feed material 24 so that each is at a required elevated temperature when material 24 reaches the extruder assembly. With gate 22 open, the push rod is able to maintain an end to end series of lengths of material 24 passing to the extruder assembly.

The zone 16 also has an inlet connector connectable to a pressurised source of protective gas. Again, the gas is supplied so as to maintain a positive overpressure in zone 16, and also in zone 18. Gas is able to pass from zone 16 to 18 via a small hole in sliding gate 22. Thus, the gas is able to issue from the outlet end of zone 18 and continue to isolate the heated feed material from other gases prior to entering the extrusion apparatus. However, as depicted by the arrow at the left-hand end of FIG. 1, further protective gas may be supplied at the outlet end.

The vessel 12 may be made of any suitable material, such as silica, a suitable steel lined with silica, or a ceramic. The heater 38 may be of any suitable type, such as an RF induction heating arrangement, a continuous electric resistance heater, or any other suitable heater system. The heater 38 may be external to the vessel 12, as depicted in FIG. 1, or internal. The push rod system may be of a magazine type to flushing chamber 14 with an oversupply of rods in vessel 12 to maintain a pre-heated rod feed supply to the feeding speed of the extruder. Alternatively, rapid heating may be employed such as via an RF induction heating source to maintain a pre-heated feed supply to the extruder.

FIGS. 2 and 3 show a sectional view through an extruder assembly 40, taken on a central plane through the middle of the peripheral groove 42 of a wheel 44. As shown, wheel 42 is rotatable on axle 46 in the clockwise direction in the view of FIG. 2, as shown by the arrow A. Adjacent to wheel 44 assembly 40 includes a shoe 48 pivotable on shaft 49 to the in-use position shown in FIG. 2. In that position, an upper face of shoe 48 bears against shoe inserts 50 and 52 and die chambers 54 that are held in place by insert locking plates 51. The shoe 48 is held in position by a clamping load depicted by arrow B. Around an arcuate extent of shoe 48 facing towards groove 42 of wheel 44, shoe 48 carries an entry block 50, die block extension 52 and die chambers 54 that fit into groove 42. A coining roll 56 guides the feed material 24 to the entry block 50 and rotates oppositely to wheel 44 as shown by arrow C. The entry block 50 and die block extension 52 guide and draw the feed material 24 along a tapered passageway they define with groove 42, that is, the incremental cross section the feed has to fill with the groove is reduced as it approaches abutment 57 by tongues 55, which are a part of entry block 50 and die block extension 52 that intrude into groove 42. The abutment 57 closes the end of the passageway and forces the advancing feed material 24 to divert outwardly into a die chamber or die chambers expansion cavity 58. The or each chamber 58 holds an extrusion die 60, retained by annular locking bolt 61 through which product 64 extruded by die 60 issues.

The feed material 24 pushed from feeder device 10 is drawn into assembly 40 by opposite rotation of wheel 44 and roll 56 as shown by respective arrows. Rotation of wheel 44 and roll 56 presents the feed material 24 to the inlet to the passageway defined by wheel 44 and shoe 48. The rotation of wheel 44 forcefully draws the material 24 along the passageway and forces the material 24 against abutment 57. The surface 57a of abutment 57 diverts the feed material outwardly into die chamber expansion cavity 58 and, from chamber 58, the feed material 24 is extruded through the orifice 60a of extrusion die 60. The abutment surface 57a is in a plane which preferably is non-radial with respect to wheel 44. The plane preferably is at an angle σ to a radial line R which is co-incident with the centre line of die 60, to generate a force component acting to divert feed material from groove 42, and through die chamber 58 and die 60. The angle σ preferably is from about 6° to 21°. An isometric view of an alternative insert form of abutment 57', shown in FIG. 3A, slides into the die chambers via a dove-tail groove. The insert abutment 57' is held in place by compression within the dove tail groove and by shoe 48. An alternative form of die, shown as 60' in FIGS. 3B and 3C may be used for multi-strand extrusions of narrow diameters of 3 mm and below. The orifice 60a of extrusion die 60 may be elliptical in cross section instead of round or even rectangular to increase the relative surface area of such wire extrusions, typically of titanium, that may be exposed to an e-beam when used as feed within e-beam additive manufacturing facilities, and the same applies to the orifices of die 60'.

As with conventional Conform extrusion of aluminium and copper, some non-ferrous high temperature formable feed material is extruded as flash through the narrow gaps along each side of the passageway between the entry block 50, die block extension 52, die chambers 54 and the side walls of the groove 42. Also, some flash can extrude between groove 42 and the sides of abutment 57. This material may be stripped from wheel 44, at a location beyond abutment 57 in the direction of rotation of wheel 44, by a blade of a scraper 62. A preferred form for blade 62 is shown in FIGS. 8 to 11.

FIG. 4 shows a feeder device 70 for feeding powder feed material to the groove 42 of the wheel 44 of an extruder assembly as in FIG. 2. Further detail is shown in FIGS. 5 and 6. The device 70 has an adjustably inclined tubular rotary kiln 72. The feeder device 70 may be positioned to the extruder by a schematically represented modular frame by movement in directions depicted by arrows H and H'. The incline of kiln 72 may be adjusted by its mountings on the modular frame 89. A feed hopper 74 is located at the upper inlet end of kiln 72, while the lower, outlet end of kiln 72 is rotatable within a spout hopper 76 having a shoe-shaped forward section 76c centred over groove 42. The hopper 74 holds a supply of powder feed material. By operation of an auto shut sliding gate 80 and sliding feed gate 82, hopper 74 is able to discharge into kiln 72 via the shoe-shaped hopper discharge 74a as controlled stream of the feed material, indicated by the arrow D. Hopper 74 may be raised or lowered via a slot (not shown but indicated by arrows J) to alter the volume underneath the hopper discharge 74a to form a constant powder height. The shoe shaped dome of hopper discharge 74a allows the powder to accumulate and slide without hang-ups and pauses in flow. At the conclusion of powder flow, a scraper 81 can pass under the hopper discharge 74a when the latter is moved up in direction J, to clean the kiln of residual powder. Rotation of kiln 72 by a drive system (not shown, but represented by the arrowed circle E) advances the feed material through kiln 72 so as to be directed into groove 42 of rotating wheel 44.

The device 70 includes a heater 84 for heating feed material in kiln 72. The heater 84 is in two stages 84a and 84b which heat the powder in respective sections of kiln 72. As kiln 72 rotates, the powder tends to be drawn up the side of kiln 72 in the direction of rotation. This can be controlled by adjusting the rotation speed and inclination of kiln 72. A shallow angle of inclination of kiln 72 to the horizontal, even as low as about 2° allows most even feeding. A funnel deck 73 may be placed as a liner within hopper 74 to maintain powder flow according to the properties of the powder if the hopper angle θ has been determined for a different powder currently not in use. Hopper 74 is provided with an air actuated tapping device (not shown, but depicted by double headed arrow F), to prevent bridging of feed material in hopper 74 if the hopper angle θ or funnel deck have not been designed for the properties of the feed material. Also, at the upper end of hopper 74, a connector 88 is provided for connection of a gas such as argon, to provide a protective atmosphere feed material in hopper 74 and for its flow into kiln 72. For the same reason, a supply 90 of protective gas is provided for flow into and along kiln 72 from the upper end, as depicted by arrow G. The gas, such as argon, maintains a protective atmosphere throughout kiln 72, with the gas exiting with the feed material in its flow through spout hopper 76 to groove 42. Powder flow from the kiln discharges into spout hopper 76, where it meets the spout hopper wall 76a inclined at about 5° from the vertical. The powder continues to slide against a spout hopper tongue 76b, which is a continuation if the wall surface 76a, that intrudes into and matches the profile of the wheel groove 42 with a clearance of no more than 0.5 mm. The powder can accumulate in the spout hopper by gravity and forward movement of wheel 44 and is contained by the lower surface of the spout hopper 76 that matches the contours of the wheel 44. (The contour matching is more clearly shown in the schematic FIG. 6.) The powder accumulates in the shoe shaped forward section of the spout 76b and moves forward into the wheel groove 42. Preferably a lump breaker rod 81a can be employed to break up any lumps due to sintering as the powder discharges from the kiln. Also, as with hopper 74, there may be a tapper F' mechanically connected to spout hopper 76 to further assist with break-up of sintered agglomerates from particularly fine powders such as H/DH powders less than 150 microns and/or at pre-heat environment temperatures greater than approximately 750° C. The tapper F' may be activated by pressurized air, as with tapper F of hopper 74.

As shown in FIGS. 5 and 6, flow of feed material to groove 42 passes opening 92, 93 in respective clamping plate 94 and shoe insert locking plate 95 (a modification of insert locking plates 51). Also, as depicted in FIG. 5, further protective gas such as argon may be supplied down plate 94, to assist in protecting the feed material as it passes from the spout hopper to the passage defined between wheel 44 and entry block 50, die block extension 52, the tongues 55 of entry block 50 and die block extension 52 and die chambers 54 of shoe 48.

FIG. 7 is a sectional view taken on a central plane through wheel 44 in the extrusion system of FIGS. 2 and 5. There is shown an outlet duct 96 of shoe 48 through which extruded product 64 issues beyond the die 60. An adjustable clamp ring 96a is secured on duct 96. Also, an elongate tubular discharge vessel 97 is secured as a continuation of duct 96, by a ring 97a at one end of vessel 97 secured to ring 96a, with an O-ring seal between rings 96a, 97a providing a gas-tight seal. Adjacent to the inlet end of vessel 97 there is an inlet connector 98 connectable to a source of pressurised protective gas, such as argon, enabling a positive pressure of the gas to be maintained in vessel 97, with the gas discharging from an outlet pipe 99. The length of vessel 97 and the cooling effect of the protective gas, which may be cooled prior to being supplied to vessel 97, are such that product issuing from vessel 97 is at a temperature enabling it to be safely force cooled such as by water spraying, or simply air-cooled in being taken onto a spool or the like.

FIGS. 8 to 11 show a preferred form of scraper 62, used to remove flash from wheel 44 in the extruder assembly 40 of FIGS. 2 and 3. The scraper 62 consists of a three piece elongate body 63 having a head portion 64 on which scraper blades 65 are mounted. The elongate body 63 consists of two mirror symmetry flanking scrapers 63a and 63b that each have an outwardly projecting head portion 64a, 64b and which together partially enclose the elongate central scraper 63c. The whole assembly comprising scraper 62 is able to be held in position adjacent to wheel 44, as shown in FIG. 2, by a holder (not shown). Scraper blades 65a, 65b are mounted onto head portions 64a, 64b of the elongate body portion 63a, 63b while scraper blade 65c is mounted onto the adjacent end of the elongate central scraper 63c. While shown as comprising three components, the scrape blades 65 may comprise a single component. The blades 65a, 65b, 65c have a flat plate form which is tapered at one side to define a sharp scraper edge 66. The blades 65a, 65b, 65c are secured to a recessed end of head portion 64 such as by screw fasteners 67 passing through openings 68 in blade 65, into threaded holes 68a in head portion 64. Ridges 68 on blade 65 locate in grooves 69 of head portion 64 to secure blade 65 in relation to head portion 64.

The elongate body portion of the groove scraper 63c is positioned forward of the flanking scrapers 63a, 63b by a threaded bolt (not shown) so that scraper edge 66 forms a substantially continuous line. The free end of central part 63c is rounded to enable it to be easily received into groove 42 of wheel 44 when edge 66 is in line. This allows the top of groove 42 to be trimmed of flash by scraper blade 65c contiguous to elongate body portion of the groove scraper 63c and the wheel 44 adjacent to the groove 42 to be trimmed of flash by scraper blades 65a, 65b contiguous to flanking scrapers 63a and 63b. Thus, the scraper 62 is able to remove flash from wheel 44, both around the perimeter of each rim and from the side walls and base of groove 42.

Extrusion from Rod Forms

Feed material comprising rods of non-ferrous high temperature formable feed material, such as of titanium, tantalum or niobium, can be extruded following feed preheats of 800° C. to 1000° C. The rods may be of wrought feed material or rods produced by cold isostatic pressing (CIP), or otherwise compacted, in each case with or without binders, preferably without. Compaction can be to greater than 60% dense, but less than 90% dense (preferably 75% dense) from powder feed material such as from CP titanium powders (or blended elemental mixtures). Cold isostatic pressing or pre-compaction allows for the feeding of powders or particulates of various size distributions such as less than about 850 μm and morphologies (e.g. sponge-like and hydrogenated/dehydrogenated, H/DH in the case of titanium and tantalum powder). Extrusion occurs when the grooved wheel was preheated to 100 to 250° C., preferably 250° C. and the coining roll, die chambers and entry block toolings were preheated to 300 to 450° C., preferably 400° C. and the abutment to 450-600° C., preferably 550° C. Modern Conform machines allow for higher wheel heating and continuous tool preheating right to the point of extrusion, which would be advantageous. Tooling preheating for the extrusion of copper and aluminium is used to preserve the tooling, particularly during start up; however for extrusion of non-ferrous high temperature formable metals, preheating is essential to reduce thermal losses from the feed and allow extrusion to occur.

The continuously extruded product is readily formable. For example, grade 3 titanium thus extruded could be swaged at room temperatures with intermediate anneals between swaging operations to reduce the continuously extruded wire diameter from 6 mm to 3 mm. Similarly, continuously extruded product from blended elemental grade 5 titanium powders could be swaged at 500° C. from 6 mm to 3 mm diameter from the as extruded and as extruded and homogenised conditions, with the latter preferred. Homogenisation could occur under vacuum or a neutral atmosphere, for example argon, at 1000° C. to 1200° C. for 1 to 2 hours with 1200° C. for 1 hour preferred.

The typical tensile properties of the continuous extruded rods from titanium powder feeds matched the titanium grade for grades 1 to 4 in the as extruded condition. Higher alloyed grades required a homogenisation anneal, after which their properties also matched the grade. Depending on the intended application, for example titanium wire for melting such as additive manufacturing feeder wire or as fastener stock, dictates the need for further post processing of the wire to achieve final microstructures etc.

For extrusion from fully dense CP titanium feed material the preferred preheat temperature for best product quality was 800° C. For this, and the other feed materials, the feed material must transition from the heating zone to the Conform tooling at a fast enough rate to remain sufficiently hot and therefore sufficiently ductile to allow extrusion to occur. With CP titanium feed material, the tensile properties of as-extruded product formed from fully dense feed after 800 to 1100° C. preheats were equivalent to the feed material with elongation reduced by 4% and strength slightly elevated by 16±4 MPa due to mild grain refining and slight increases in interstitial levels (not more than 0.05 wt. % maximum).

The product from rod form feed may have a thin oxide layer on the surface (less than 50 μm in the case of a blue oxide film on titanium extrudate) but the bulk metal of the extrusion has very similar oxygen and nitrogen levels as the feed. The microstructure is more homogenous when processing titanium high in the alpha phase field or low in the beta phase field than when processing higher in the beta phase field. For the former two cases the bulk of the metal is equiaxed and grain refined (compared to equiaxed starting material), however, a region of greater refinement occurs at the periphery. A more homogenous microstructure is achieved when the preheat temperature of titanium feed material rod-form is within <±50° C. along its length. Hot defects such as metal folding and swirling were also more likely to occur when extruding from higher in the beta phase field.

The heat generated by the extrusion process produces tooling temperatures typically below 500° C. in the region near the abutment, about 100 to 150° C. below the preheat temperature at the abutment face (57a, FIG. 3) and up to 700° C. in the die block extension, so controlled cooling for each tooling component is required for continuous runs. Successful extrusion of CP titanium is possible at extrusion stresses (through the die insert) of 0.5 to 6.0 GPa, depending on the extrusion ratio. Some abrasive and galling wear of the abutment occurs for the production of long extrudate lengths that may be controlled by hard facing the die insert and minimised by controlled cooling. The abutment profile needs to match the profile of the groove to maintain an even flash gap and prevent side wear of the abutment. The rake angle between the abutment face and the centreline of the extrudate is appropriate at 21° but can be reduced to 6° to better suit feed material, such as titanium, and reduce galling wear of the abutment surface. A reduction in the rake angle also reduces the stress through the abutment from about 1.2 to 1.0 GPa. The addition of hydrogen to the titanium powder by using titanium hydride powder or hydrogenated titanium can reduce the flow stress and further reduce extrusion and abutment stress. It is necessary however to vacuum anneal such product to remove residual hydrogen. Improved thermal control of the abutment is also required to maintain abutment hardness and reduce wear, such as through controlled water cooling after extrusion has begun. Water cooling was found to remove 350° C. of temperature from the abutment, which reduced to 150° C. of removed temperature when helium gas was used as the cooling medium. A wear resistant facing insert on the abutment or a thermal and wear resistant barrier layer such as PSZ is preferred to increase abutment 57 wear life for super alloy tools such as Rene 95. A higher strength, high temperature, high thermal conductivity alloy, such as a tungsten-based W-25Re-4HfC as the material for critical parts such as the abutment insert 57' are suggested to increase product volumes per tool. Tooling wear from super alloy tools, particularly for runs of tens of meters and inadequate tool cooling, results in contamination within the product and sites for beta phase stabilisation for titanium.

It is possible to produce a grain refined titanium alpha structure by processing fully dense coarser grained feed low in the alpha field. For CP titanium grain sizes not more than about 3 μm are possible by preheating the leading end for at least a length of one wheel circumference and leaving the trailing end at room temperature. The hot leading end coats the wheel and the cold end continues through the tooling to produce a highly grain refined alpha structure.

Flashing rates increase with lower preheat temperatures and are also indicative of higher loads. To reduce flashing rates, the gaps through which flashing occurs between the shoe insert tooling and wheel surfaces were reduced to 0.2 to 0.5 mm; the latter more common due to machine tolerances.

Under typical conditions, extrusion of feed material cannot be stopped mid-run by allowing the feed material to cool and harden in the wheel groove and die, then restarted by preheated feed being fed back to the extrusion wheel. The tooling and resident feed material metal needs to be reheated to greater than 500° C. to allow extrusion to be restarted, or, after a continuous extrusion run, the die chambers tooling needs to be removed, a fresh die chambers tooling placed in the machine for a new extrusion run and the original die chambers cleaned. Material that remains in the grooved wheel does not need to be removed as long as the tyre thickness remains within the flash gap tolerances and necessary purity levels. This material can be flushed through but remains at the surface and into the bulk of the extrudate and can result in an heterogeneous microstructure. Such material would probably have to be further thermomechanically worked, such as by repeat passing and possibly a post mill anneal, to achieve final properties.

To generate sufficient frictional interface between the CIPed rods and the wheel groove, the coining roll was set at a height that was sufficient to hot compact the feed to at least 90% density within the groove. The feed material thus upset within the groove and with an intimate frictional interface with the groove, was able to be extruded through about 85° shear at the abutment. Ignoring strain effects due to the 85° shear, the extrusion ratio from the green diameter to the extrusion product was 0.8 to 4.0. The density of the product was greater than 99%. Great control of the flash gaps to 0.2 to 0.3 mm, controlled heat flow through the wheel 44 by reduced cooling by using a fluid of less thermal capacity than water such as silicone oil and additional external heating of insert die 60 to at least 400° C. at start up was necessary to achieve extrusion ratios greater than 6.4 for a single pass through the system. A multi-strand die insert 66' (FIGS. 3B and 3C) may be preferred for extrusion ratios of 16. Scaling down of the feed input, such as by reducing the dimensions of groove 42, abutment 57 and shoe insert tongues 55 also allows for the production of narrower gauge material.

As with the fully dense rod feed, processing the cold isostatic pressed rods high in the beta phase field resulted in a heterogeneous and coarse microstructure. Extrusion high in the alpha and/or low in the beta phase fields for titanium feed material is required for process optimisation. Product from powder feeds can benefit from a post mill anneal to return ductility.

The heat generated near the abutment is higher when extruding from fully dense rod than is the case for extruding from powder compacted rod feed material at equivalent feed preheats. The required extrusion power is also greater when extruding from fully dense feeds compared to partially dense, however fully dense feeds require less energy to produce equivalent product lengths because extrusion from less dense feeds requires greater time.

Powders compacted, such as by cold isostatic pressing, to produce bars from powder blends of CP titanium and Al-40V master alloy without binders to Ti-6Al-4V compositions can be extruded using CP titanium as a soft matrix to produce a composite structure of CP titanium as the majority phase and dispersed particles of master alloy intermetallics. There is little diffusion between the soft matrix and intermetallic particles in the as extruded product. The remnant master alloy particles can be removed following a beta homogenisation treatment at 1000 to 1200° C. for 1 to 4 hours to produce a coarse grained structure for further wrought forming to narrower gauge. The homogenisation temperature depends on the coarseness of the master alloy particles (D50 of 64 to 25 μm attempted) in the blended powder.

Extrusion from Free Flowing Powder

Non-ferrous high temperature formable powder feed to the rotary extruder may be delivered via the powder feeder unit as elemental or blended elemental powder mixtures in as-received or pelletised conditions. Heating residence time is controlled by feeder rotation and tilt, allowing for the full range of powder morphologies to be delivered to the extruder. Powder feed material that was fed via the powder feeder unit to the extruder in the case of titanium powder, included −140 μm hydrogenated/dehydrogenated powder pelletised to flake, discs or cuboids (+1 mm, −4 mm); or as raw powder (−0.85 mm, +0.355 mm) and −140 μm. Other powder morphologies and sizes are also possible.

Powder mass and heat flows were matched to the mass output of the extruder. Extrusion is possible for flowing powders preheated to 510 to 1000° C. At the lower end of this preheating range the microstructure of the extrusions was ultra grain refined with the grain size less than 3 μm, in the case of CP titanium extrusions. Preferred extrusion temperatures are alloy dependent, but for CP titanium, a preheat temperature high in the alpha field is preferred (at about 800° C.). At close to 600° C. titanium powders, particularly when subject to an external stress, have a tendency to stick or sinter together into an agglomeration. The mass flow from the powder feeder must be regulated, therefore, to maximise powder build up to the compacting zones under the shoe inserts by controlling the degree of flood feeding by matching the wheel rotation speed to the powder delivery speed to the wheel and prevent agglomeration and blockage. Agglomeration and blockage may be further reduced and finer powders at higher temperatures successfully delivered by the application of a tapper at the spout hopper. Extrusion is possible at wheel surface speeds of 0.02 m/s to 0.32 m/s, with 0.16 to 0.33 m/s preferred. Fast initial wheel speed may be needed to form a tyre and then the speed of the wheel may be reduced to more closely match the mass flow to the top of the wheel with the mass flow out of the die insert.

Extrusion for CP titanium occurred from free flowing H/DH powder of tap density greater than 30 to 50% of theoretical when the ratio of powder pellet or powder D50 to groove width was greater than 0.33 and did not occur when the ratio was less than 0.046 at 510° C.

Extrusion from ratio values of <0.046 to 0.33 is possible at higher preheats as this results in increasing the stickiness and frictional interaction of the titanium granules with each other and the walls of the wheel groove. Further, precompaction by the introduction of a driven coining roll may allow extrusion from ratio values less than 0.046 by increasing frictional interaction between the granules and the groove wheel surfaces as well as increasing the density of the powder in the groove. Increasing the density of low density powders (10 to 30% of theoretical) by pre-compaction or other method such as milling or some combination is also beneficial.

Finally, it is to be understood that various alterations, modifications and/or additions may be introduced into the constructions and arrangements of parts previously described without departing from the spirit or ambit of the invention.

The invention claimed is:

1. A process for extruding feed materials of a high temperature formable non-ferrous metal that is susceptible to embrittlement during in air processing, using an apparatus including an extrusion system having a rotatable wheel and shoe which is positionable to enable a shoe to cover part of the length of a groove around the periphery of the wheel to form an arcuate passageway having a first, inlet end and a second end, the shoe having an abutment which substantially closes the second end of the passageway and an extrusion die spaced from the abutment by a die chamber, the extrusion die having a die orifice; wherein feed material for the process is selected from titanium, tantalum, niobium, and an alloy of any of titanium, tantalum and niobium and the process includes the steps of:
pre-heating the feed material to a pre-heat temperature not less than about 390° C. in a chamber defined by a feeder device,
maintaining a protective atmosphere substantially free of oxygen and nitrogen in the chamber of the feeder device while the feed material is heated in the feeder device to the pre-heat temperature,
passing the pre-heated feed material from the feeder device to the inlet end of the passageway,
drawing the pre-heated feed material along the passageway to cause the pre-heated feed material to be forced by engagement with the abutment into the die chamber and through an extrusion orifice defined by the die to provide an extruded product, and
the extruded product is passed from the die orifice and cooled.

2. The process of claim 1, wherein the pre-heat temperature is substantially in excess of a temperature solely due to friction and shear deformation of the feed material generated by rotation of the wheel and extrusion.

3. The process of claim 1, wherein the feed material is titanium or a titanium alloy, or alloy containing near 50 atomic percent titanium and wherein the pre-heat temperature is in a range from 760° C. to 1140° C.

4. The process of claim 1, wherein the feed material is any one of tantalum, tantalum alloy, niobium and a niobium alloy, and wherein the pre-heat is in a range from 760° C. to 1140° C.

5. The process of claim 1, wherein the feed material is coarse grained titanium and the pre-heat temperature is not in excess of 650° C., whereby the extruded product is ultra-fine grain product.

6. The process of claim 1, wherein the feed material comprises unconsolidated or pelletised powder, and the pre-heat temperature is from 400° C. to 850° C.

7. The process of claim 1, wherein the feed material is passed continuously from the feeder device to the inlet of the passageway of the extrusion system.

8. The process of claim 1, wherein the feed material is of elongate rod form and is continuously passed through the feeder device to the inlet of the passageway of the extrusion system.

9. The process of claim 1, wherein the feed material comprises lengths of rod form, and the lengths are passed in an end-to-end series from the feeder device to the inlet of the passageway of the extrusion system.

10. The process of claim 1, wherein the feed material comprises uncompacted or pelletised powder which is passed from the feeder device to the groove of the wheel, adjacent to the inlet of the passageway.

11. The process of claim 1, wherein the feed material is maintained in a protective atmosphere in passing from the feeder device to the inlet of the passageway of the extrusion system.

12. The process of claim 1, wherein the extruded product passes from the die orifice into a protective atmosphere in which the extruded product is cooled to a temperature at which it can be exposed to atmospheric oxygen and nitrogen.

13. The process of claim 1, wherein the protective atmosphere comprises argon.

14. The process of claim 1, wherein the feed material comprises solid, or compact powder, rod form feed material which is pre-heated to a temperature of from about 800° C. to 1100° C. and, on start-up of extrusion, components of the extrusion system rapidly heat up to a respective initial operating temperature and are cooled to achieve respective steady state temperatures, and wherein start-up temperatures are:

| CR | 200-400° C. |
|----|-------------|
| SI | 300-450° C. |
| A  | 300-600° C. |
| DI | 300-500° C. |
| W  | 100-400° C. | where CR designates a coining roll adjacent to the inlet to the passageway, with the temperatures taken at a roll bearing housing of the extrusion system;
SI designates a shoe insert of the shoe;
A designates the abutment;
DI designates a die insert of the die; and
W designates the wheel.

15. The process of claim 14, wherein the start-up temperatures are:

| | |
|---|---|
| CR | 250-300° C. |
| SI | 320-400° C. |
| A | 450-550° C. |
| DI | 350-400° C. |
| W | 180-300° C. |

16. The process of claim 14, wherein the steady state temperatures are:

| | |
|---|---|
| CR | 300-400° C. |
| SI | 600-700° C. |
| A | 600-1050° C. for Taor Nb and 600-95° C. for Ti |
| DI | 600-800° C. |
| W(a) | 250-400° C. |
| W(b) | 600-1000° C., and | where W(a) designates the steady state temperature of the wheel taken diametrically opposite the abutment, and W(b) designates the steady state temperature of the wheel proximate the abutment.

17. The process of claim 14, wherein the steady state temperatures are:

| | |
|---|---|
| CR | less than 350° C. |
| SI | 600-630° C. |
| A | 600-650° C. |
| DI | 500-650° C. |
| W(a) | 250-290° C. |
| W(b) | 600-75° C. | where W(a) designates the steady state temperature of the wheel taken diametrically opposite the abutment, and W(b) designates the steady state temperature of the wheel proximate the abutment.

18. Apparatus for producing an extruded product from feed material of a high temperature formable non-ferrous metal that is susceptible to embrittlement during processing in air, the metal being selected from titanium, tantalum, niobium and an alloy of any of titanium, tantalum and niobium, the apparatus including:
  (a) an extrusion system having:
    a rotatable wheel having a groove around the periphery of the wheel;
    a shoe positionable to cover part of the length of the groove of the wheel to form an arcuate passageway having a first, inlet end and a second end;
    an abutment carried or defined by the shoe for substantially closing the second end of the passageway; and
    an extrusion die carried by the shoe and spaced from the abutment by an extrusion chamber defined by the shoe;
  (b) a feeder device which defines a chamber into which feed material is able to be received and from which the feed material is able to pass to the inlet of the passageway of the extrusion system;
  (c) a heater associated with the feeder device and operable to heat the feed material while in the chamber to a pre-heat temperature of not less than about 390° C.;
  (d) a connection device associated with the feeder device and connectable to a pressurized source of protective gas to enable maintenance of an atmosphere of protective gas in the chamber of the feeder device while feed material is being heated to the pre-heat temperature;
  (e) a device for feeding pre-heated feed material from the feeder device to the inlet end of the passageway of the extrusion system to enable pre-heated feed material to be drawn along the passageway by rotation of the wheel whereby the pre-heated feed material is forced by engagement with the abutment into the die chamber and through an extrusion orifice defined by the die to produce the extruded product; and
  (f) an elongate discharge vessel which forms an outlet for the extruder system through which extruded product is able to pass, whereby the extruded product is able to cool to a temperature at which it can be handled prior to exiting the vessel.

19. The apparatus of claim 18, wherein the chamber of the feeder device is an elongate chamber having an inlet end for receiving rod form feed material and an outlet end through which pre-heated feed material is able to pass to the inlet of the passageway of the extrusion system.

20. The apparatus of claim 19, wherein the feeder device defines an airlock into which lengths of rod form feed material are receivable, with the airlock being connectable to a source of pressurized protective gas to enable the feed material to be flushed by protective gas prior to being passed to the chamber, and a feed valve between the airlock and chamber is operable to enable or prevent feed material from passing from the airlock to the chamber.

21. The apparatus of claim 19, wherein a gate is provided between the outlet end of the chamber and an outlet end section of the feeder device through which the pre-heated feed material is able to pass to the inlet end of the passageway of the extrusion system.

22. The apparatus of claim 18, wherein the heater is an RF induction heater or an electric resistance heater.

23. The apparatus of claim 18, wherein the feeder device consists of a rotatably mounted, inclined tubular kiln having a container for a supply of unconsolidated powder feed material at an upper end of the kiln, with a lower end of the kiln having a guide device for guiding pre-heated powder into the groove of the wheel of the extrusion system at a location adjacent to the inlet end of the passageway, with the heater located intermediate of the upper and lower ends of the kiln; the feeder device further including a device for rotating the kiln.

24. The apparatus of claim 23, wherein the supply at the upper end of the kiln is a feed hopper having an outlet for discharging powder feed material within the upper end of the kiln, the hopper having a connector enabling the supply of protective gas to the feed hopper for discharge into the upper end of the kiln with the powder.

25. The apparatus of claim 23, wherein the guide device is a discharge hopper in an upper end of which the lower end of the kiln is rotatable, the discharge hopper having an outlet spout opening over the groove of the wheel of the extrusion system.

26. The apparatus of claim 25, wherein at least one of the feed hopper and the outlet hopper has an associated tapper device operable to assist the flow of powder feed material.

27. The apparatus of claim 23, wherein a scraper device is provided in the kiln to assist with the flow of powder feed material from the lower end of the kiln.

28. The apparatus of claim 23, wherein the heater encircles at least one region of the kiln intermediate of the upper and lower ends.

\* \* \* \* \*